United States Patent
Yamada et al.

(10) Patent No.: US 10,800,033 B2
(45) Date of Patent: Oct. 13, 2020

(54) ROBOT CONTROL APPARATUS, ROBOT CONTROL METHOD, ROBOT SYSTEM, AND STORAGE MEDIUM

(71) Applicant: CANON KABUSHIKI KAISHA, Tokyo (JP)

(72) Inventors: Daisuke Yamada, Kawasaki (JP); Kazuhiko Kobayashi, Yokohama (JP); Masahiro Suzuki, Kawasaki (JP); Tetsuri Sonoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 187 days.

(21) Appl. No.: 15/473,197

(22) Filed: Mar. 29, 2017

(65) Prior Publication Data
US 2017/0282363 A1    Oct. 5, 2017

(30) Foreign Application Priority Data

Mar. 31, 2016 (JP) .................. 2016-070131

(51) Int. Cl.
*B25J 15/00* (2006.01)
*B25J 15/10* (2006.01)
*B25J 9/16* (2006.01)

(52) U.S. Cl.
CPC ........... *B25J 9/1612* (2013.01); *B25J 9/1697* (2013.01); *B25J 15/0071* (2013.01); *B25J 15/106* (2013.01); *Y10S 901/30* (2013.01)

(58) Field of Classification Search
CPC .... B25J 15/0071; B25J 15/106; B25J 9/1612; B25J 9/1697; Y10S 901/30
See application file for complete search history.

(56) References Cited

U.S. PATENT DOCUMENTS

| | | | |
|---|---|---|---|
| 4,609,220 A | 9/1986 | Scott | |
| 5,688,013 A | 11/1997 | Sehrt | |
| 9,283,674 B2* | 3/2016 | Hoffman | ................. B25J 9/161 |
| 2009/0314112 A1* | 12/2009 | Melville | ............. B25J 15/0608 74/144 |
| 2011/0290855 A1* | 12/2011 | Moore | ................. A61B 17/072 227/180.1 |

(Continued)

FOREIGN PATENT DOCUMENTS

| | | |
|---|---|---|
| JP | S59-201778 A | 11/1984 |
| JP | 2013-523478 A | 6/2013 |

OTHER PUBLICATIONS

Peter B. Scott, "The 'Omnigripper': a form of robot universal gripper," Robotica, vol. 3, pp. 153-158, 1985.

*Primary Examiner* — Robert T Nguyen
(74) *Attorney, Agent, or Firm* — Canon U.S.A., Inc. IP Division

(57) ABSTRACT

A robot control apparatus for controlling a robot manipulating a target object includes a measurement unit configured to measure a change of a gripping unit configured to grip the target object when the gripping unit contacts the target object, a first acquisition unit configured to acquire the change of the gripping unit measured by the measurement unit, a second acquisition unit configured to acquire a gripping state, which is a state of gripping of the target object by the gripping unit, based on the change of the gripping unit acquired by the first acquisition unit, and a control unit configured to control an action of the robot based on the gripping state acquired by the second acquisition unit.

18 Claims, 11 Drawing Sheets

(56) References Cited

U.S. PATENT DOCUMENTS

| | | | |
|---|---|---|---|
| 2013/0238129 A1* | 9/2013 | Rose | F04B 9/10 |
| | | | 700/258 |
| 2014/0163737 A1* | 6/2014 | Nagata | B25J 9/1697 |
| | | | 700/259 |
| 2014/0365009 A1* | 12/2014 | Wettels | B25J 9/1612 |
| | | | 700/258 |
| 2016/0073584 A1* | 3/2016 | Davidson | A01D 46/30 |
| | | | 56/328.1 |
| 2016/0136820 A1* | 5/2016 | Lessing | B25J 15/10 |
| | | | 294/208 |
| 2017/0151679 A1* | 6/2017 | Wong | B25J 15/10 |

\* cited by examiner

ROBOT CONTROL APPARATUS, ROBOT CONTROL METHOD, ROBOT SYSTEM, AND STORAGE MEDIUM

BACKGROUND OF THE INVENTION

Field of the Invention

The present invention relates to a robot control apparatus for controlling a robot that manipulates a target object, a related robot control method, a related robot system, and a related storage medium.

Description of the Related Art

In manipulation of a target object by a robot, a position and orientation of the target object that is to be gripped by the robot has conventionally been measured with a vision sensor.

A target object may be gripped in a situation in which measurement of the exact position and orientation of the target object with a vision sensor is difficult. To address such a case, a robot hand that contacts the target object is equipped with a force sensor so that a contact position of the robot hand with the target object can be measured, thereby correcting a measurement error in the position and orientation of the target object.

Regarding gripping a target object in a situation in which measurement of the exact position and orientation of the target object with a vision sensor is difficult, Japanese Unexamined Patent Application Publication (Translation of PCT Application) No. 2013-523478 discusses a universal gripper that includes a large amount of granular material wrapped with an elastic film. The universal gripper discussed in Japanese Unexamined Patent Application Publication (Translation of PCT Application) No. 2013-523478 uses positive and negative pressures to passively conform to the shape of the target object. In this way, the target object can be gripped without using a vision sensor even if a position to approach the target object is unknown.

Further, P. B. Scott, "The 'Omnigripper': a form of robot universal gripper", Robotica vol. 3, pp. 153-158, September 1985 discusses an omnigripper that includes fingers constituted by an array of a plurality of pins. The fingers according to P. B. Scott, "The 'Omnigripper': a form of robot universal gripper", Robotica vol. 3, pp. 153-158, September 1985 can passively fit the shape of a target object and grip the target object.

According to the techniques discussed in Japanese Unexamined Patent Application Publication (Translation of PCT Application) No. 2013-523478 and P. B. Scott, "The 'Omnigripper': a form of robot universal gripper", Robotica vol. 3, pp. 153-158, September 1985, the robot only passively conforms to the shape of the target object to be gripped. There has therefore been a problem that the gripping state of the target object by the gripper cannot be recognized and thus the target object cannot be appropriately gripped. For example, in an operation of gripping and classifying a plurality of types of target objects, the plurality of types of target objects cannot be classified because the shapes of the gripped target objects are not known.

SUMMARY OF THE INVENTION

Embodiments of the present invention are directed to a robot control apparatus capable of recognizing a gripping state of a target object and of appropriately gripping the target object even in a case where measurement of the position and orientation of the target object is difficult, a related robot control method, a related robot system, and a related storage medium.

According to an aspect of the present invention, a robot control apparatus for controlling a robot manipulating a target object includes a measurement unit configured to measure a change of a gripping unit configured to grip the target object when the gripping unit contacts the target object, a first acquisition unit configured to acquire the change of the gripping unit measured by the measurement unit, a second acquisition unit configured to acquire a gripping state, which is a state of gripping of the target object by the gripping unit, based on the change of the gripping unit acquired by the first acquisition unit, and a control unit configured to control an action of the robot based on the gripping state acquired by the second acquisition unit.

Further features of the present invention will become apparent from the following description of exemplary embodiments with reference to the attached drawings.

DESCRIPTION OF THE EMBODIMENTS

Exemplary embodiments of the present invention will be described in detail below with reference to the accompanying drawings.

The exemplary embodiments described below are just examples of means for practicing the present invention. The exemplary embodiments may be modified or changed as appropriate according to configurations of apparatuses to which the present invention is applied and various conditions. The present invention is not limited to the following exemplary embodiments.

A robot system according to a first exemplary embodiment is a system for controlling a robot including an end effector. The end effector includes a plurality of bars (gripping unit) that can move passively conforming to a shape of a target object. In the robot system, displacements of the plurality of bars included in the end effector of the robot, moving passively conforming to the shape of the target object, are measured to recognize a gripping state of the end effector with respect to the target object and recognize whether the target object can be gripped and the shape of the target object.

After the recognition of the gripping state with respect to the target object, if the target object is determined to be able to be gripped, the plurality of bars included in the end effector can proceed to grip the target object and then perform, for example, a classifying operation on the gripped target object.

Such processing can be performed to grip and measure the shape of a target object that is difficult to recognize by a vision sensor.

According to the present exemplary embodiment, the "target object" to be manipulated by the robot may be a semitransparent or transparent part that is difficult to recognize by a vision sensor. Examples include a toner container. In the present exemplary embodiment, such target objects may be put in a box in a bulk manner. In the present exemplary embodiment, "classifying" refers to classifying and placing a plurality of target objects in specified locations type by type.

(Configuration of Robot System)

Figure 1:
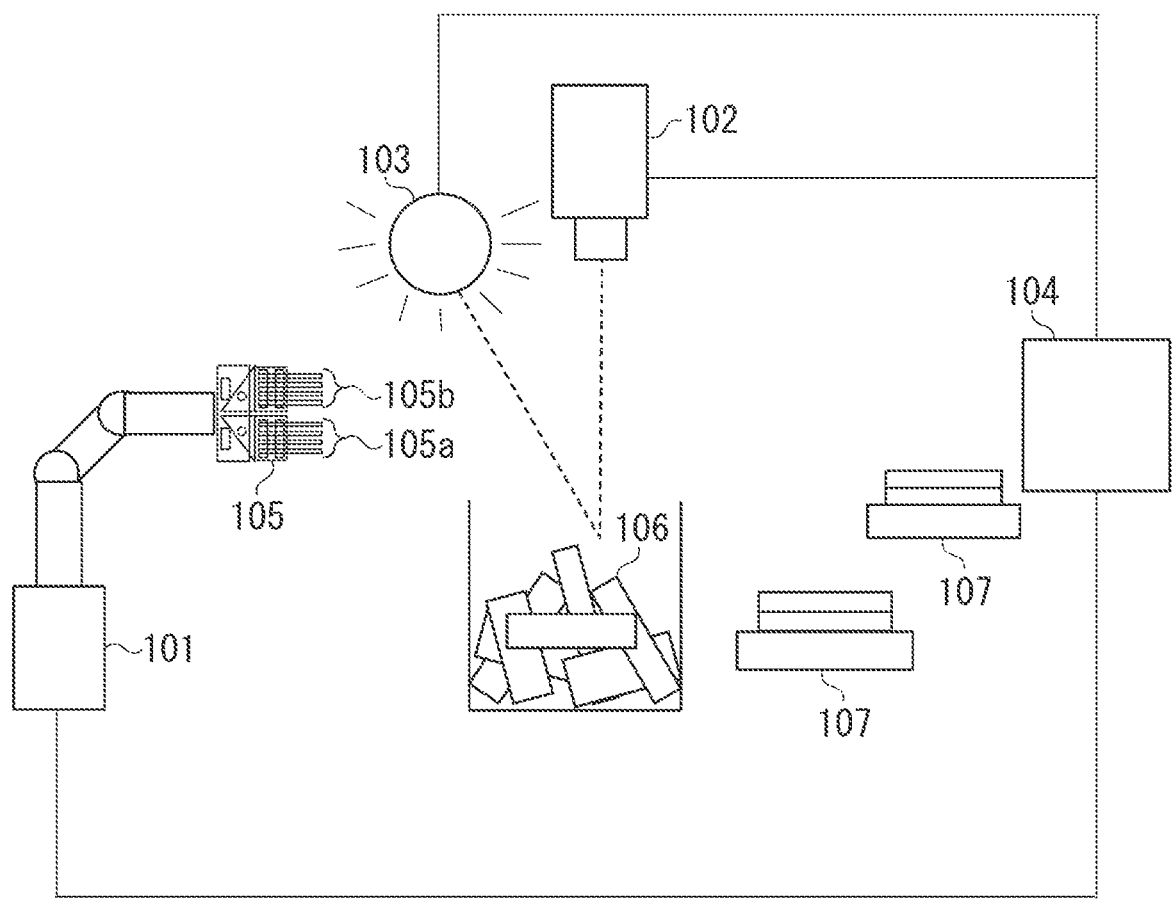
FIG. 1 is a diagram illustrating an outline of a device configuration of a robot system according to a first exemplary embodiment.

FIG. 1 is a diagram for describing an example of a configuration of the robot system for implementing gripping of a target object and recognition processing of the target object by the robot system according to the present exemplary embodiment. FIG. 1 illustrates an example of a device configuration of the robot system according to the present exemplary embodiment, and is not intended to limit the range of application of the present invention.

A robot 101 is a robot including a robot arm. An end effector 105 for gripping and manipulating (for example, moving) a target object 106 is attached to the end portion of the robot arm. The robot 101 performs an action determined by an information processing apparatus 104 (robot control apparatus) to manipulate the target object 106.

As employed herein, an "action" refers to an operation of the robot 101 for manipulating a target object or target objects 106. For example, in FIG. 1, an action may include the robot 101 gripping target objects 106, transporting the target objects 106, and classifying and arranging the target objects 106 in arrangement locations 107 type by type.

An imaging device (vision sensor) 102 is an imaging unit. The imaging device 102 may include, for example, a camera, a light-detecting sensor, or a photodiode. The imaging device 102 obtains image information about the target objects 106 and the arrangement locations 107. The information processing apparatus 104 processes the image information obtained by the imaging device 102.

For example, the imaging device 102 may be attached to the arm of the robot 101 or the end effector 105. Alternatively, the imaging device 102 may be fixedly attached to an external position where an image of the location in which the target objects 106 are placed and the arrangement locations 107 for the target objects 106 to be arranged in can be captured.

A light source 103 may include, for example, a projector which projects visible light. Alternatively, the light source 103 may be configured to project infrared light by using a laser. The light (visible light or infrared laser light) from the light source 103 illuminates the target objects 106 and the arrangement locations 107 with uniform illumination light or patterned light. Similar to the imaging device 102, the light source 103 may be attached to the robot 101. The light source 103 may be fixedly installed in an external position where the target objects 106 and the arrangement locations 107 can be illuminated.

The information processing apparatus 104 is an apparatus for controlling the robot 101. The information processing apparatus 104 includes a calculator such as a computer, and an auxiliary storage device such as a hard disk.

The information processing apparatus 104 is connected to the robot 101, the imaging device 102, the light source 103, and the end effector 105 via interface equipment. The information processing apparatus 104 can communicate with such devices any time, and controls an operation of such devices.

The end effector 105 manipulates, for example, grips a target object 106.

In the present exemplary embodiment, a change of the end effector 105 when the end effector 105 contacts a target object 106 is measured. The information processing apparatus 104 recognizes states of the target object 106 based on the measured change of the end effector 105. The states to be recognized include the gripping state of the target object 106 by the end effector 105, and the shape, position, and orientation of the target object 106.

In the present exemplary embodiment, the end effector 105 includes fingers which include an array of a plurality of bars (bar-like members) each making contact with the target object 106. The fingers refer to the portions that contact and grip the target object 106. Examples include the portions of a parallel opening and closing chuck between which a target object 106 is sandwiched. The fingers include the plurality of bars (bar-like members) and a base accommodating the bars. The base has a plurality of holes in which the respective plurality of bars advances or retreats.

With such a configuration, if the fingers come into contact with a target object 106, the bars of the respective fingers move up and down (in the longitudinal direction of the bars) to positions where to contact the target object 106 conforming to the shape of the target object 106. Such changes in position, or displacements, of the bars can be measured to recognize the shape of the target object 106. The changes of the plurality of bars of the fingers may be obtained in a form other than the changes in position, or displacements, of the bars. Examples include the speed and acceleration of the bars. The displacements of the fingers (bars) can be measured by using a vision sensor such as a camera. To obtain measurements of the displacements of the fingers from an image, in the present exemplary embodiment, circular parts are attached to or near the top portions of the bars constituting the fingers (the ends of the bars to contact the target object 106). An image of the circular parts attached to the top portions can be captured by the camera and the sizes of the circular parts can be measured to find out the amounts of movement (displacements) and positions of the bars.

The circles of the circular parts can be detected by using a typical image processing library. For example, the Open Source Computer Vision (OpenCV) library is used to perform a Hough transform on specified areas in the captured image. Circles are detected by the Hough transform, and the sizes of the detected circles are measured.

There may be prepared a table in which a correction between the size of a detected circle and the displacement of a finger is recorded in advance. The table can be referred to calculate (recognize) the displacements of the fingers from the sizes of the circles. For example, such a correlation table may be stored in the information processing apparatus 104. The correlation table may be provided in an external location accessible from the information processing apparatus 104.

In such a manner, the displacements of the fingers (bars) are measured and the gripping state of the target object 106 by the fingers is recognized to determine whether the target object 106 can be gripped. If the target object 106 is estimated to be able to be gripped, the robot 101 proceeds to grip the target object 106. On the other hand, if the target object 106 is estimated to be unable to be gripped, a measurement is performed again. More specifically, another action is set by adjusting the position and orientation of the end effector 105, and the displacements of the bars of the fingers are measured again.

The target objects 106 are ones to be manipulated, i.e., to be subjected to manipulation processing by the robot 101. Examples include toner containers. The target objects 106 are supposed to be gripped, transported, and classified by the robot 101. For example, the toner containers may be semi-transparent parts. Different types of toner containers have different sizes. The target objects 106 put in a bulk state are taken out by the robot 101, and arranged in the arrangement locations 107 type by type. The arrangement locations 107 are locations in which the target objects 106 gripped by the robot 101 are classified and arranged type by type. For example, the arrangement locations 107 may be belt conveyors for respective different types. The target objects 106 classified and arranged thereon are conveyed by the belt conveyors for subsequent recycling processing.

(Recognition of Gripping State)

Now, the recognition of the gripping state will be described with reference to FIGS. 2A, 2B, and 3 that illustrate measurement results of the state of the fingers by the camera.

Figure 2A:
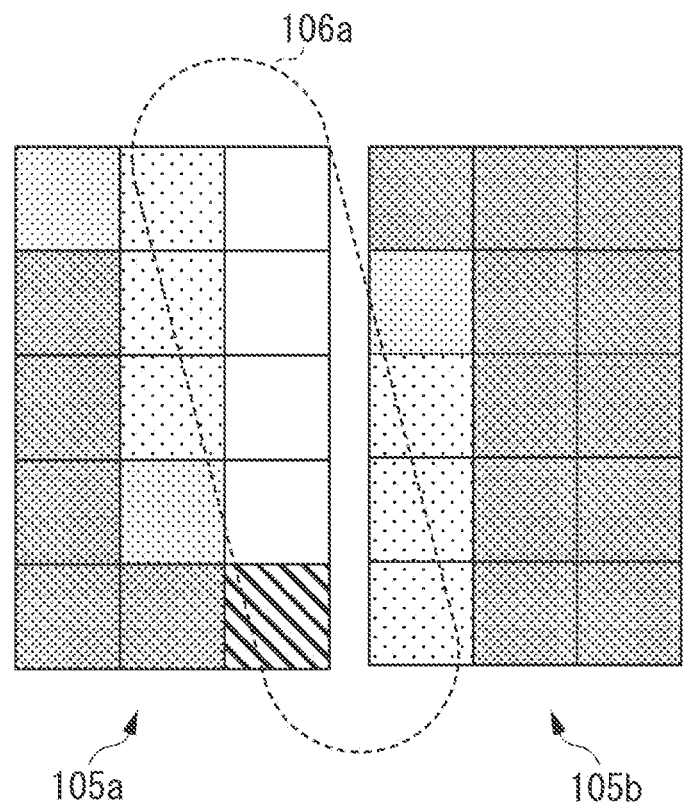
FIGS. 2A and 2B are diagrams illustrating a method for recognizing a target object according to the first exemplary embodiment.
Figure 2B:
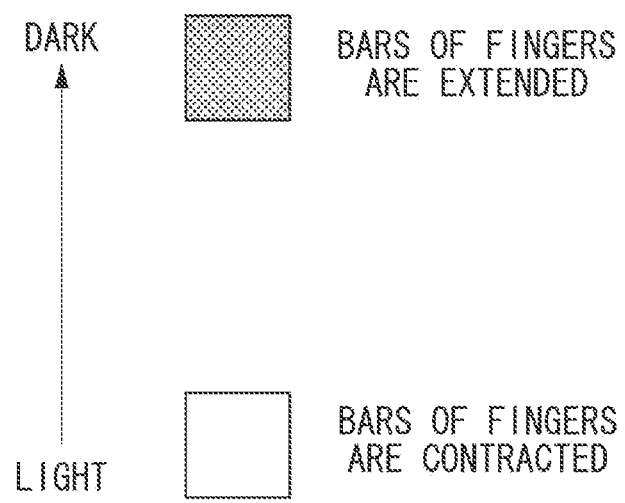

FIG. 2A is a diagram illustrating extension and contraction of the bars constituting the fingers of the end effector 105 when the fingers in contact with a target object 106 are seen from the target object 106 side. In FIG. 2A, whether the bars of the fingers are "extended" or "contracted" is expressed by dark and light areas. FIG. 2B is a diagram illustrating the relationship between the dark/light areas and the extension/contraction of the bars of the fingers. Dark areas indicate that the bars of the fingers are extended. Light areas indicate that the bars of the fingers are in contact with the target object 106 and contracted.

FIG. 2A illustrates a state in which the bars arranged on an inner side among those constituting the fingers are contracted, and the bars of the fingers on outer sides among those constituting the fingers are extended. In such a case, the fingers are recognized to be in a state of being able to sandwich a target object 106a between the bars of the fingers extended at both ends if the fingers are simply closed (claws 105a and 105b illustrated in FIG. 2A are narrowed). As a result, the target object 106a is estimated to be able to be gripped.

Figure 3:
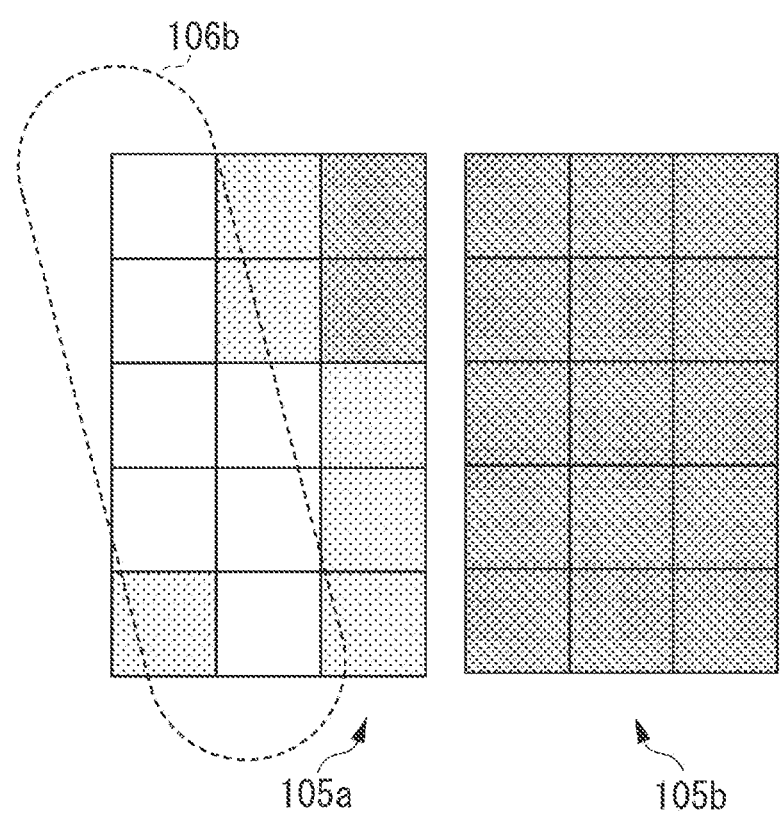
FIG. 3 is a diagram illustrating the method for recognizing a target object according to the first exemplary embodiment.

On the other hand, in FIG. 3, the inner bars of the fingers are extended and the outer bars (left ones in FIG. 3) and contracted. In such a case, the fingers are recognized to be in a state of being unable to sandwich a target object 106b if the fingers are simply closed.

As a result, the target object 106b is estimated to be unable to be gripped.

The gripping state may be geometrically recognized based on the shape of the target object 106 known in advance. A lot of data samples may be previously stored by using machine learning techniques, and the recognition may be performed based on the results.

In the present exemplary embodiment, the gripping is performed by sandwiching the target object 106 between the fingers. To perform such gripping, for example, the end effector 105 is configured to include two blocks, and fingers (including a plurality of bars) are attached to each block.

For gripping, rotation mechanisms are attached to the bottoms of the blocks. Actuators driving the rotation mechanisms can be activated to grip the target object 106 so that the fingers (claws 105a and 105b) of the right and left blocks wrap around the target object 106. The positions of the fingers change with rotation. Measurement devices for measuring the changes in the positions of the fingers can be attached to the blocks to measure the positions of the fingers regardless of the driving of the actuators. Alternatively, the fingers may be driven to sandwich and grip the target object 106 not by the rotation mechanisms but by translation mechanisms.

As described above, in the present exemplary embodiment, the end effector 105 includes the bar-like gripping unit. When the plurality of bars (bar-like members) comes into contact with the target object, the plurality of bars moves passively to follow the shape of the target object 106. The shape of the target object 106 can be recognized from changes in the positions of the respective bars when the plurality of bars contacts the target object 106. The plurality of bars can also be used as the fingers for gripping the target object 106. The plurality of bars configured in two distinct blocks sandwiches and grips the target object 106 therebetween. The plurality of bars (bar-like gripping unit) constituting the end effector 105 thus has two types of functions, a recognition function and a gripping function.

In the present exemplary embodiment, when the end effector 105 contacts the target object 106, the plurality of bars constituting the fingers of the end effector 105 moves passively conforming to the shape of the target object 106 and grips the target object 106. The "gripping state" refers to the state in which the plurality of bars (gripping unit) grips the target object 106.

More specifically, "recognizing the gripping state" involves success/failure recognition of gripping about whether the target object 106 is successfully gripped by the fingers (plurality of bars) as planned. In addition to the success/failure recognition of gripping, recognition of information about the target object 106, such as whether virtual dynamics including the shape and softness of the target object 106 is successfully recognized, is also involved.

(Configuration of Functional Elements of Robot System)

Figure 4:
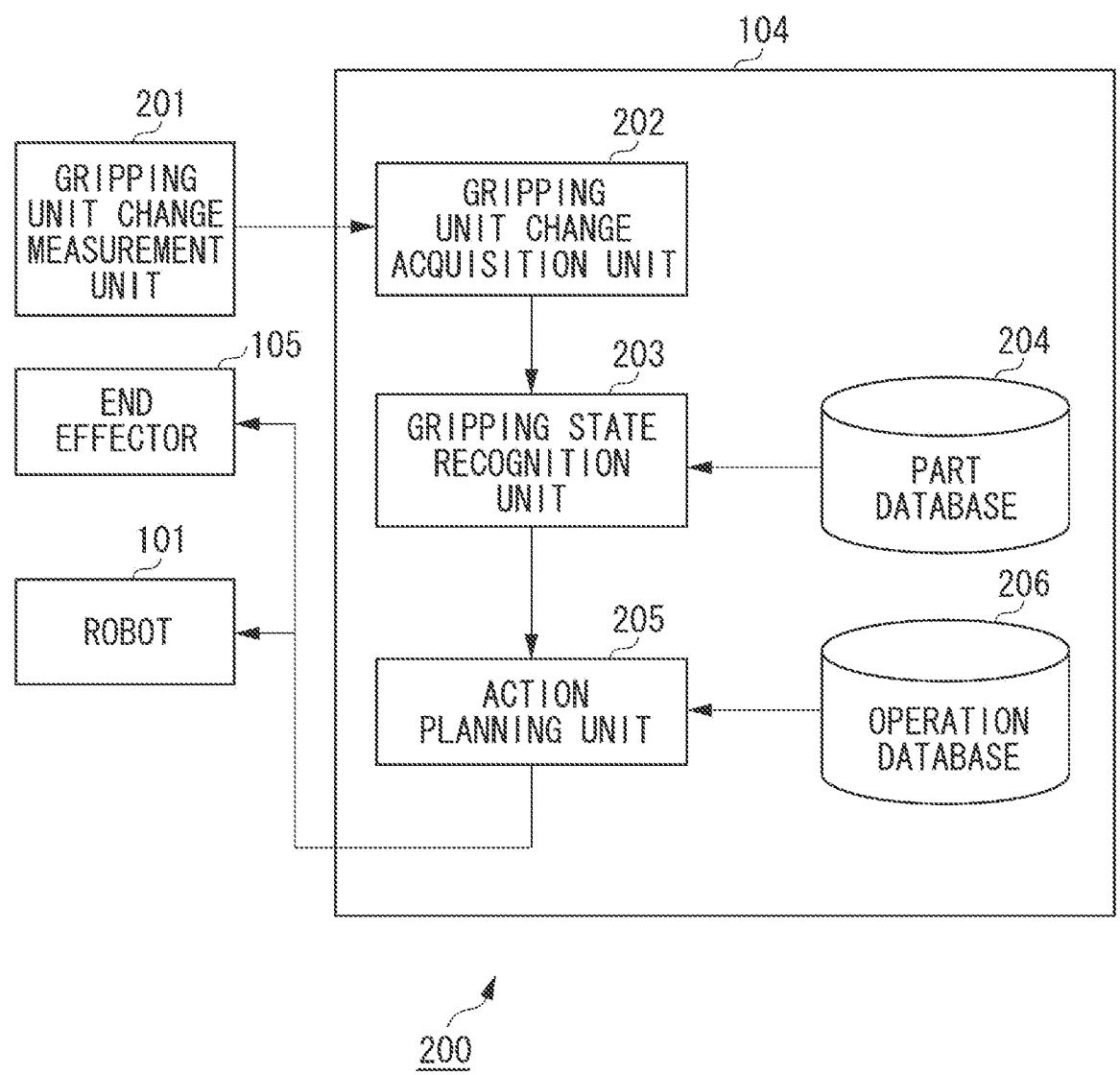
FIG. 4 is a block diagram illustrating functional elements of the robot system according to the first exemplary embodiment.

FIG. 4 is a diagram schematically illustrating a configuration of functional elements of a robot system 200 for implementing the classifying operation of the target objects 106 according to the present exemplary embodiment and a relationship between the functional elements.

The information processing apparatus 104 is a robot control apparatus for controlling the robot 101. The information processing apparatus 104 includes a gripping unit change acquisition unit 202 (first acquisition unit), a gripping state recognition unit 203 (second acquisition unit), a part database 204, an action planning unit 205 (planning unit, control unit), and an operation database 206. For example, the information processing apparatus 104 may include a computer. The gripping unit change acquisition unit 202, the gripping state recognition unit 203, and the action planning unit 205 may be implemented by a central processing unit (CPU) of the computer executing a predetermined program to control predetermined hardware.

The robot 101 operates according to operation commands from the action planning unit 205.

The end effector 105 is attached to the end of the arm of the robot 101, and operates according to operation commands from the action planning unit 205.

A gripping unit change measurement unit 201 (measurement unit) is a unit for measuring a change of the fingers serving as the gripping unit of the end effector 105. An example of the gripping unit change measurement unit 201 is a camera. For example, the camera may be attached to the end effector 105. The camera may be attached to the robot 101. The camera may be arranged on or attached to an external position other than the robot 101. The camera may be located in any position as long as the displacements of the fingers can be measured.

Aside from the camera, the gripping unit change measurement unit 201 may be a unit that can directly measure a change of the fingers, such as an encoder. The gripping unit change measurement unit 201 may be other units that can indirectly measure a change of the fingers.

The gripping unit change acquisition unit 202 obtains the result of measurement of the gripping unit change measurement unit 201. For example, if a camera serving as the gripping unit change measurement unit 201 performs gripping unit change measurement (captures an image), the image obtained from the camera is stored, for example, in a capture board or a random access memory (RAM) (memory) in the information processing apparatus 104. The gripping unit change measurement unit 201 then performs measurement processing of a change of the gripping unit on the image.

As described in the description of the end effector 105, examples of the change of the gripping unit (fingers) for the gripping unit change measurement unit 201 to measure include a change in position, or displacement, of the fingers (plurality of bars), a change in the speed of the bars, and a change in the acceleration of the bars. The gripping unit change measurement unit 201 may measure at least one of the changes. The gripping state recognition unit 203 recognizes the gripping state of the target object 106 from the result obtained by the gripping unit change acquisition unit 202. Recognizing the gripping state involves the success/failure recognition of gripping about whether the target object 106 is successfully gripped, and the recognition of the shape of the target object 106. As described above, the gripping state can be recognized from the displacements of the bars of the fingers (see FIGS. 2A, 2B, and 3).

The part database 204 stores information about part types and part shapes of target objects 106.

The gripping state recognition unit 203 refers to data on the target object 106 in the part database 204 as appropriate in recognizing the gripping state of the target object 106. Examples of the data on the target object 106 to be referred to may include computer-aided design (CAD) data on the target object 106 and model data on computer graphics (CG) polygons. Other examples of the data on the target object 106 to be referred to may include a set of two-dimensional images of the target object 106 observed in different directions and dimension data on the target object 106.

Such a part database 204 can be used to recognize the gripping state of the target object 106 more accurately. However, the part database 204 does not necessarily need to be used. As described in FIGS. 2A, 2B, and 3, the gripping state of the target object 106 may be recognized only from the displacements of the bars of the fingers.

With the gripping state recognized by the gripping state recognition unit 203 as an input, the action planning unit 205 plans an action of the robot 101 to generate an action plan based on the recognized gripping state. The action planning unit 205 outputs the generated action plan as action commands to the robot 101 and the end effector 105.

The operation database 206 stores information about the types of parts (part types) for the action planning unit 205 to refer to in planning an action of the robot 101, and information about operation procedures. The action planning unit 205 refers to the foregoing information in the operation database 206 as appropriate in planning an action.

As employed herein, an "action plan" refers to planning of various actions, such as an action by which the robot 101 contacts the target object 106 and ones for a gripping operation and an arrangement operation, and the resulting generated plan. The action plan may be made based on a result of three-dimensional shape measurement on the image obtained by the imaging device 102. The action plan may be made based on information about the gripping state, obtained by the end effector 105.

(Gripping and Recognition Processing Performed by Robot System)

Figure 5:
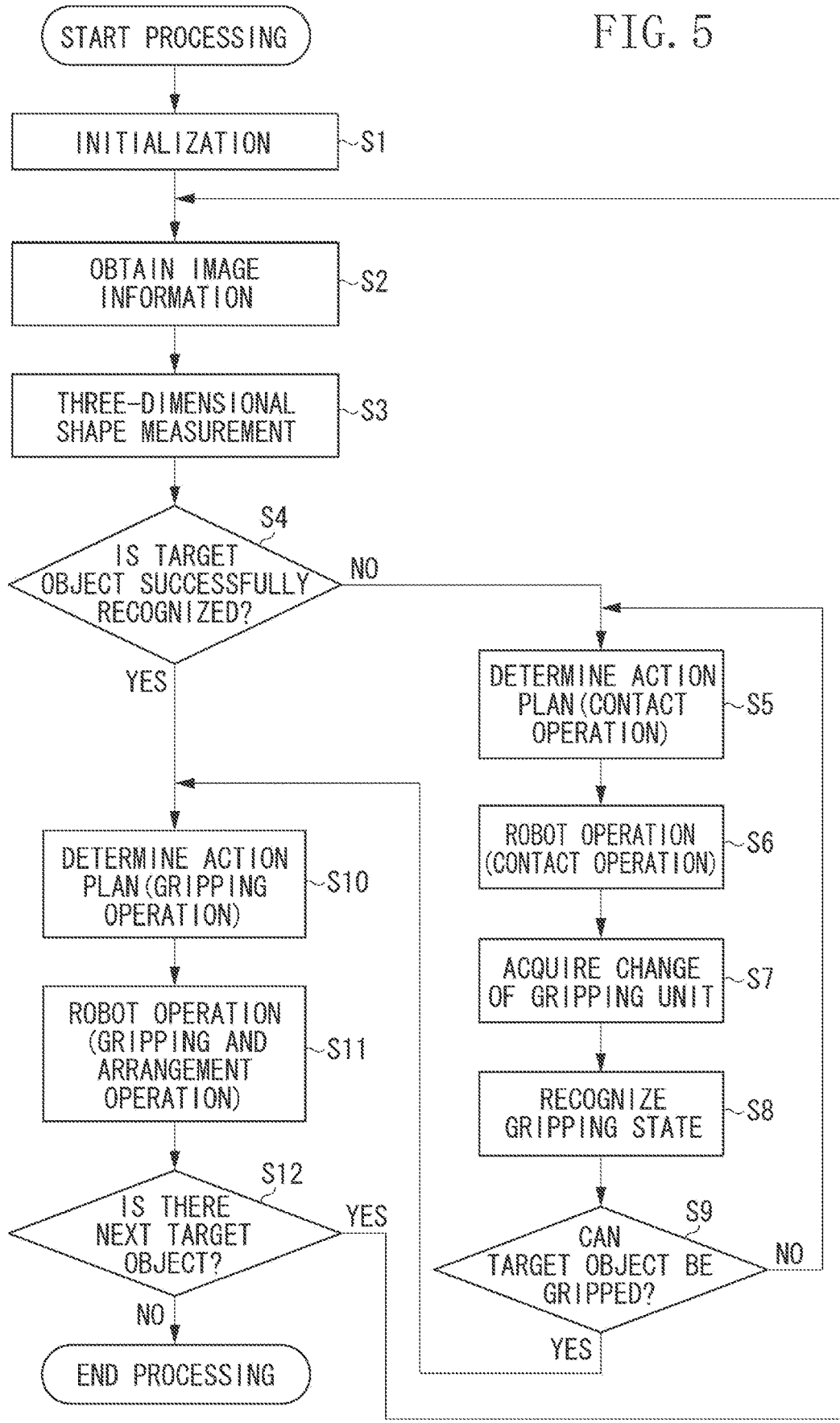
FIG. 5 is a flowchart illustrating processing performed by the robot system according to the first exemplary embodiment.

FIG. 5 is a flowchart illustrating a flow of processing performed by the robot system 200 according to the present exemplary embodiment. The processing illustrated in FIG. 5 is performed mainly by the information processing apparatus 104. The processing procedure will be described below with reference to the FIG. 5.

In step S1, the information processing apparatus 104 initializes the robot system 200 according to the present exemplary embodiment. More specifically, the apparatuses and devices included in the robot system 200 are activated, for example, by the user. If the information processing apparatus 104 is activated, the information processing apparatus 104 loads a program for implementing the robot system 200. The program is loaded into a not-illustrated memory of the information processing apparatus 104. As a result, the CPU in the information processing apparatus 104 becomes ready to execute the program.

In step S1, the robot 101, the imaging device 102, and the end effector 105 also read various device parameters and return to their initial positions, whereby the devices become usable.

In step S2, the gripping unit change acquisition unit 202 obtains image information about the target objects 106 and the arrangement locations 107 by using the imaging device 102 constituting the gripping unit change measurement unit 201.

In step S3, the gripping state recognition unit 203 performs three-dimensional shape measurement. The three-dimensional shape measurement can be performed, for example, by pattern matching with the target objects 106. More specifically, the gripping state recognition unit 203 refers to the information of the part database 204, and performs pattern matching to determine the part type of the target objects 106 based on the image information obtained by the imaging device 102. Specific examples of the method for pattern matching include correlation-based matching. According to the correlation-based matching, the part type of the target objects 106 can be determined by recognizing a most similar pattern by comparison of a plurality of types of part patterns stored in the part database 204 and the input image. While pattern matching is described to be used, other processing may be used as long as the part type of the target objects 106 can be determined.

Next, the gripping state recognition unit 203 performs model fitting to the target objects 106 based on the result of determination of the pattern matching.

More specifically, for example, the gripping state recognition unit 203 performs fitting processing between edges in the image of the target objects 106 captured under uniform illumination and an edge model based on the CAD data stored in the part database 204. Such model fitting can be performed to measure the positions and orientations of the target objects 106.

Alternatively, a technique for determining distance point group data on the surfaces of the target objects 106 based on the principle of triangulation may be used. More specifically, for example, the light source 103 is made to emit multi-line patterned light, and an image of the illuminated target objects 106 is captured. The pattern projected on the surfaces is detected from the obtained image, and distance point group data on the surfaces of the target objects 106 is determined based on the principle of triangulation.

The gripping state recognition unit 203 can then perform fitting processing between the obtained distant point group data on the surfaces of the target objects 106 and a point group model of the target objects 106 stored in the part database 204 to measure the positions and orientations of the target objects 106. The fitting processing can be performed, for example, by using an iterative closest point algorithm. Processing other than that of the iterative closest point algorithm may be applied as long as model fitting can be performed. The specific processing for measuring the positions and orientations of the target objects 106 described above is just an example. Algorithms other than those of the pattern matching and the model fitting may be used as long as the positions and orientations of the target objects 106 can be measured.

In step S4, the gripping state recognition unit 203 determines whether a target object 106 is successfully recognized. More specifically, if a target object 106 is successfully recognized by the three-dimensional shape measurement in step S3 (YES in step S4), the processing proceeds to step S10 to determine an action plan for performing the gripping operation of the target object 106. On the other hand, if a target object 106 fails to be recognized by the three-dimensional shape measurement (NO in step S4), the processing proceeds to step S5 to determine an action plan for performing a contact operation on the target object 106. Whether the target object 106 is successfully recognized can be determined, for example, depending on whether the value of an error in the model fitting between the distance point group data and the point group data is smaller than a threshold value. More specifically, if the value of the error is smaller than the threshold value, the target object 106 may be determined to be successfully recognized by the three-dimensional shape measurement. If the value of the error is greater than or equal to the threshold value, the target object 106 may be determined to fail in the three-dimensional shape measurement.

In step S5, the action planning unit 205 determines an action plan for performing a contact operation on the target object 106. Even if the target object 106 fails to be recognized in step S3, an approximate position of the target object 106 may be known. In such a case, an action plan can be determined with the approximate position as a target position. More specifically, by using the measured distance image, the action planning unit 205 can determine a closest position within an area where the target object 106 is likely to be, or a position where distance information of size similar to the dimensions of the target object 106 is obtained, to be a target position. The values of the position and orientation measured by the recognition processing in step S3 may be used as the approximate position.

The former, closest position within the area where the target object 106 is likely to be is determined in the following manner. Suppose that the bars arranged on an inner side of the fingers are extended and the bars arranged on an outer side of the fingers are contracted as illustrated in FIG. 3. In such a case, the target object 106b is determined to be highly likely to be on the outer side (in FIG. 3, the outer left side). The position of the target object 106 is then estimated based on the dimensions of the target object 106 known in advance. The latter position where the distance information of size similar to the dimensions of the target object 106 is obtained can be determined from the three-dimensional shape of the measured target object 106 as described in step S3.

If the position of the target object 106 is totally known, a predetermined area where a target object 106 may exist can be used as the target position. The action planning unit 205 plans an action of the robot 101 to bring the end effector 105 to the target position so that the end effector 105 can come into contact with the target object 106.

In step S6, the robot 101 performs a contact operation with respect to the target object 106 based on the action plan determined in step S5. In the contact operation, the robot 101 operates toward the target position until the end effector 105 comes in contact with the target object 106 and measures a change of the gripping unit (fingers). If the end effector 105 reaches the target position and the gripping unit is not detected to be in contact with the target object 106, a new target position is set to perform the operation again.

In step S7, the gripping unit change acquisition unit 202 acquires the result of the robot 101 making the operation and the end effector 105 contacting the target object 106 in step S6. More specifically, when the fingers including the plurality of bars serving as the gripping unit come into contact with the target object 106, each of the plurality of bars moves passively conforming to the shape of the target object 106. The gripping unit change measurement unit 201 measures the resulting displacements of the respective bars.

The specific method of measurement is the same as described above. For example, circular-shaped pieces (circular pieces) are attached to the top portions of the respective bars. An image of the plurality of bars is captured by the camera at a time. The positions where the bars are in contact with the target object 106 can then be calculated from the relationship between the size of the circular-shaped pieces and the displacements of the bars in the image. The gripping unit change acquisition unit 202 obtains the change of the gripping unit (fingers) by obtaining the calculation results. The processing proceeds to step S8.

In step S8, the gripping state recognition unit 203 recognizes the gripping state from the measurement result acquired in step S7. As described above, the gripping state includes the state about whether the target object 106 is successfully gripped with reliability, the state of the end effector 105 gripping, and states such as the shape, position, and orientation of the target object 106 which can be recognized from the state of the bars in contact with the target object 106.

The gripping state recognition unit 203 recognizes the gripping state by using the information about the change of the gripping unit obtained by the gripping unit change acquisition unit 202 and the information about the target object 106 read from the part database 204.

In step S9, the gripping state recognition unit 203 determines whether the target object 106 can be gripped. More specifically, the gripping state recognition unit 203 makes the determination based on the result of recognition of the gripping state with respect to the target object 106 in step S8.

If, as a result of the determination, the target object 106 is determined to be able to be gripped (YES in step S9), the processing proceeds to step S10 to determine an action plan for the gripping operation of the target object 106. On the other hand, if the target object 106 is determined to be unable to be gripped (NO in step S9), the processing proceeds to step S5 to make an action plan for performing the contact operation again.

For example, if the measurement result as illustrated in FIG. 3 is obtained, the target object 106b is estimated to be on the left (in FIG. 3) of the end effector 105. The action plan of the robot 101 for the next contact operation is thus made to shift the end effector 105 to the left so that the end effector 105 can contact a position where the target object 106b is highly likely to be. In such a manner, the new action plan is determined by using the result of recognition of the gripping state obtained so far.

In step S10, the action planning unit 205 determines the action plan of the robot 101 for the gripping operation. If the processing proceeds from step S4 to step S10 (YES in step S4), the plan is generated from an approach operation toward the target object 106.

Figure 6:
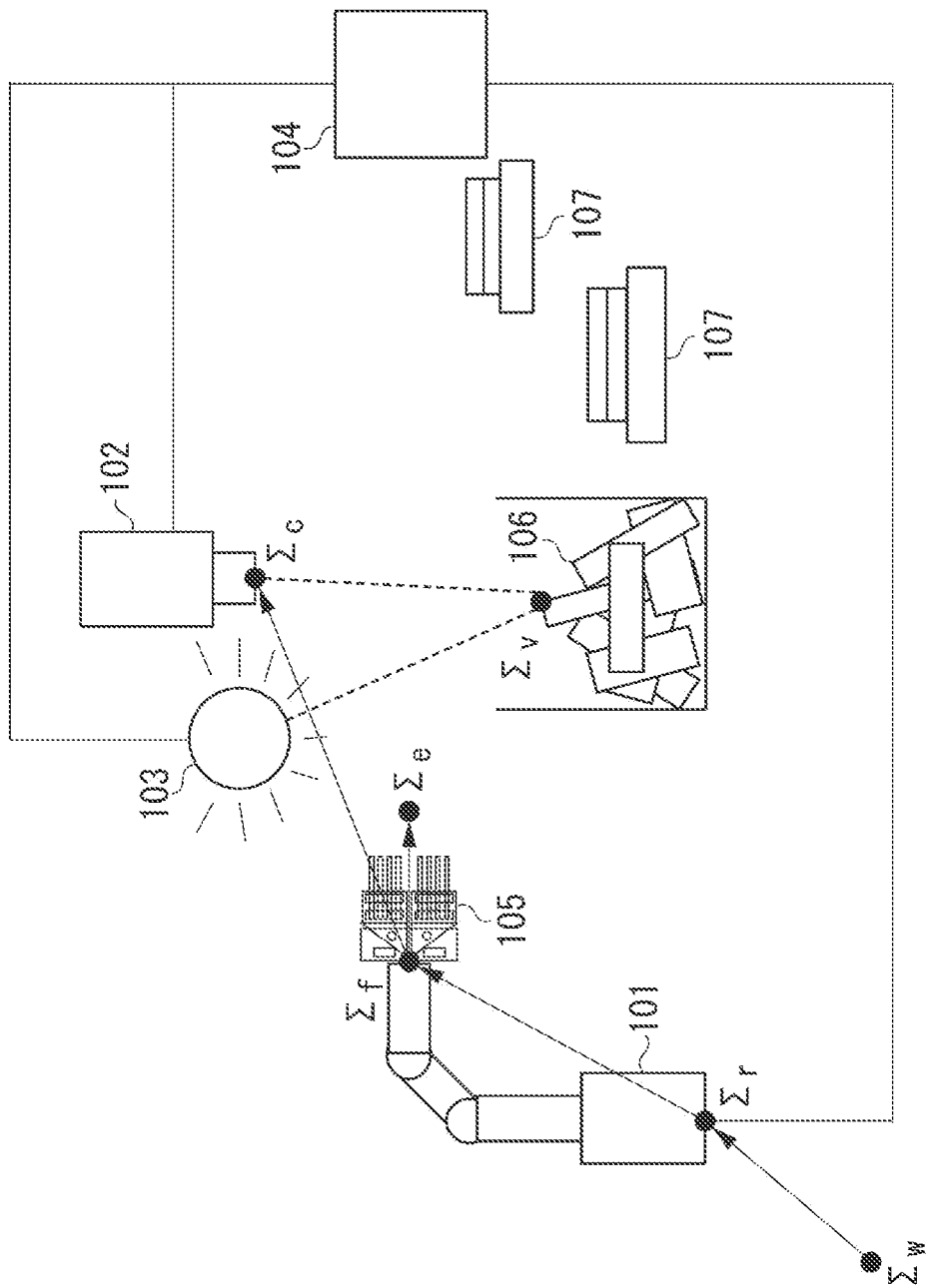
FIG. 6 is a diagram illustrating a relationship between coordinate systems of the robot system according to the first exemplary embodiment.

The action plan to be determined will be described in specific terms. As illustrated in FIG. 6, a world coordinate system Σw is initially set as a reference coordinate system in the working space. A displacement from the world coordinate system Σw to a robot coordinate system Σr will be denoted by (RX, RY, RZ). A 3×3 rotation matrix representing the orientation of the robot 101 will be denoted by RM. The foregoing displacement (RX, RY, RZ) and the rotation matrix RM may be considered to be constants if the robot 101 is fixed.

On the other hand, if the robot 101 is not fixed, for example, nine-axis sensors (a three-axis gyro sensor, a three-axis acceleration sensor, and a three-axis geomagnetic sensor) may be attached to the robot 101 to determine the displacement (RX, RY, RZ) and the rotation matrix RM. Alternatively, position recognition markers may be previously installed around the range of motion of the robot 101 to determine the displacement (RX, RY, RZ) and the rotation matrix RM. Methods other than those of the techniques described above may be used as long as the position and orientation of the robot 101 with respect to the world coordinate system Σw can be found out.

A displacement from the robot coordinate system Σr to a front end coordinate system Σf of the robot 101 will be denoted by (FX, FY, FZ). A 3×3 rotation matrix representing the orientation of the forward of the robot 101 will be denoted by FM. The displacement (FX, FY, FZ) and the rotation matrix FM can be calculated from the link lengths and joint angles of the robot 101 by forward kinematics.

A displacement from the front end coordinate system Σf of the robot 101 to a coordinate system Σe at the end of the end effector 105 attached to the end of the robot 101 will be denoted by (EX, EY, EZ). A 3×3 rotation matrix representing the orientation of the end of the end effector 105 attached to the end of the robot 101 will be denoted by EM. The displacement (EX, EY, EZ) and the rotation matrix EM can be calculated by directly measuring the distance from the end of the robot 101 to the end of the end effector 105 and the orientation of the end of the end effector 105.

A displacement from the robot coordinate system Σr to an imaging device coordinate system Σc will be denoted by (CX, CY, CZ). A 3×3 rotation matrix representing the orientation of the imaging device 102 will be denoted by CM. The displacement (CX, CY, CZ) and the rotation matrix CM can be similarly calculated by directly measuring the distance from the end of the robot 101 to the imaging device 102 and the orientation of the imaging device 102.

A displacement from the imaging device coordinate system Σc to a target object coordinate system Σv will be denoted by (VX, VY, VZ). A 3×3 rotation matrix representing the rotation of the target object 106 will be denoted by VM. The displacement (VX, VY, VZ) and the rotation matrix VM to be determined by performing measurement as described in step S3.

The displacement of the target object 106 as seen from the world coordinate system Σw will be denoted by (WX, WY, WZ). A 3×3 rotation matrix representing the orientation of the target object 106 as seen from the world the coordinate system Σw will be denoted by WM. The values of the displacement (WX, WY, WZ) and the rotation matrix WM can be calculated by using the following formula 1.

[Math. 1]

$$\begin{pmatrix} & & & WX \\ & WM & & WY \\ & & & WZ \\ 0 & 0 & 0 & 1 \end{pmatrix} = \begin{pmatrix} & & & RX \\ & RM & & RY \\ & & & RZ \\ 0 & 0 & 0 & 1 \end{pmatrix} \cdot \begin{pmatrix} & & & CX \\ & CM & & CY \\ & & & CZ \\ 0 & 0 & 0 & 1 \end{pmatrix} \begin{pmatrix} & & & VX \\ & VM & & VY \\ & & & VZ \\ 0 & 0 & 0 & 1 \end{pmatrix} \quad \text{formula (1)}$$

Similar processing can be repeated to determine the positions and orientations of the classifying locations (arrangement locations 107). The action planning unit 205 then plans an action to generate an action plan based on the result of recognition of the gripping state recognition unit 203. In the present exemplary embodiment, the action of the robot 101 is planned and the action plan is generated as described above.

To perform the gripping operation, the action planning unit 205 generates and issues a command to perform a closing operation to the end effector 105 based on the generated action plan.

On the other hand, if the processing proceeds from step S9 to step S10 (YES in step S9), the action planning unit 205 determines the action plan of the robot 101 based on the result of recognition in step S8. The action planning unit 205 issues commands to the robot 101 and the end effector 105 according to the determined action plan.

In step S11, the robot 101 and the end effector 105 operate based on the action plan of the robot 101 determined in step S10. The gripping operation and the arrangement operation of the target object 106 are thereby performed. In the arrangement operation, the gripped target object 106 is classified and arranged in an appropriate arrangement location 107 according to the recognized type of the target object 106.

In step S12, the information processing apparatus 104 determines whether there is a next target object 106, based on the image obtained by the imaging device 102 or the result of recognition in step S8. If there is a next target object 106 (YES in step S12), the processing returns to step S2 and proceed on. If there is no next target object 106 (NO in step S12), the measurement according to the present exemplary embodiment ends and the gripping and arrangement operation of the target object 106 ends.

As described above, the three-dimensional shape of a target object 106 may fail to be recognized by the vision sensor, for example. In such a case, according to the present exemplary embodiment, a change of the fingers of the end effector 105 resulting from the contact with the target object 106 is measured. The gripping state of the target object 106 is thereby recognized. The target object 106 is then gripped based on the result of recognition. Such an operation can be performed to recognize the shape of the target object 106 and grip the target object 106 even if the exact position and orientation of the target object 106 are unable to be recognized by the vision sensor alone. This increases the possibility for the target object 106 to be successfully gripped. The gripped target object 106 can also be classified by type.

A second exemplary embodiment deals with an example of controlling external force applied to the target object 106. More specifically, virtual dynamics is applied to the robot system 200 described in the foregoing first exemplary embodiment in a direction in which the fingers move. The robot system is thereby configured to be able to control external force applied to the target object 106 during a contact operation.

More specifically, in the present exemplary embodiment, elastic parts (elastic members) such as a spring are attached to the bars (for example, the top portions of the bars) constituting the fingers (gripping unit) of the end effector 105. The external force applied to the target object 106 with which the end effector 105 is in contact is recognized based on the displacements of the fingers (displacements of the bars) and rigidity of the elastic parts.

In the first exemplary embodiment, the shape of the target object 106 is recognized in consideration of only the static operation of the gripping unit (fingers). If the target object 106 is wrapped in a plastic bag or other cushioning materials (packaging materials), the end effector 105 in contact with the target object 106 is therefore not always able to fully compress the packaging materials. In such a case, the shape of the contents, i.e., the target object 106 itself is not always able to be measured.

In contrast, according to the present exemplary embodiment, the external force applied to a target object 106 can be controlled to compress the packaging materials around the target object 106 while measuring the shape of the contents. With such a control, the shape of the target object 106, the contents, can be accurately measured to increase the possibility of continuing operation even if the target object 106 is wrapped with cushioning materials such as a plastic bag.

In the present exemplary embodiment, the target object 106 will be described to be a toner bottle which is wrapped with cushioning materials such as a plastic bag. For example, toner bottles wrapped with cushioning materials such as a semitransparent or nontransparent plastic bag are put in a box in a bulk manner. An example in which, from this state, the robot 101 classifies and arranges the target objects 106 (toner bottles) into arrangement locations 107 according to types of the target objects 106 will be described.

Figure 7:
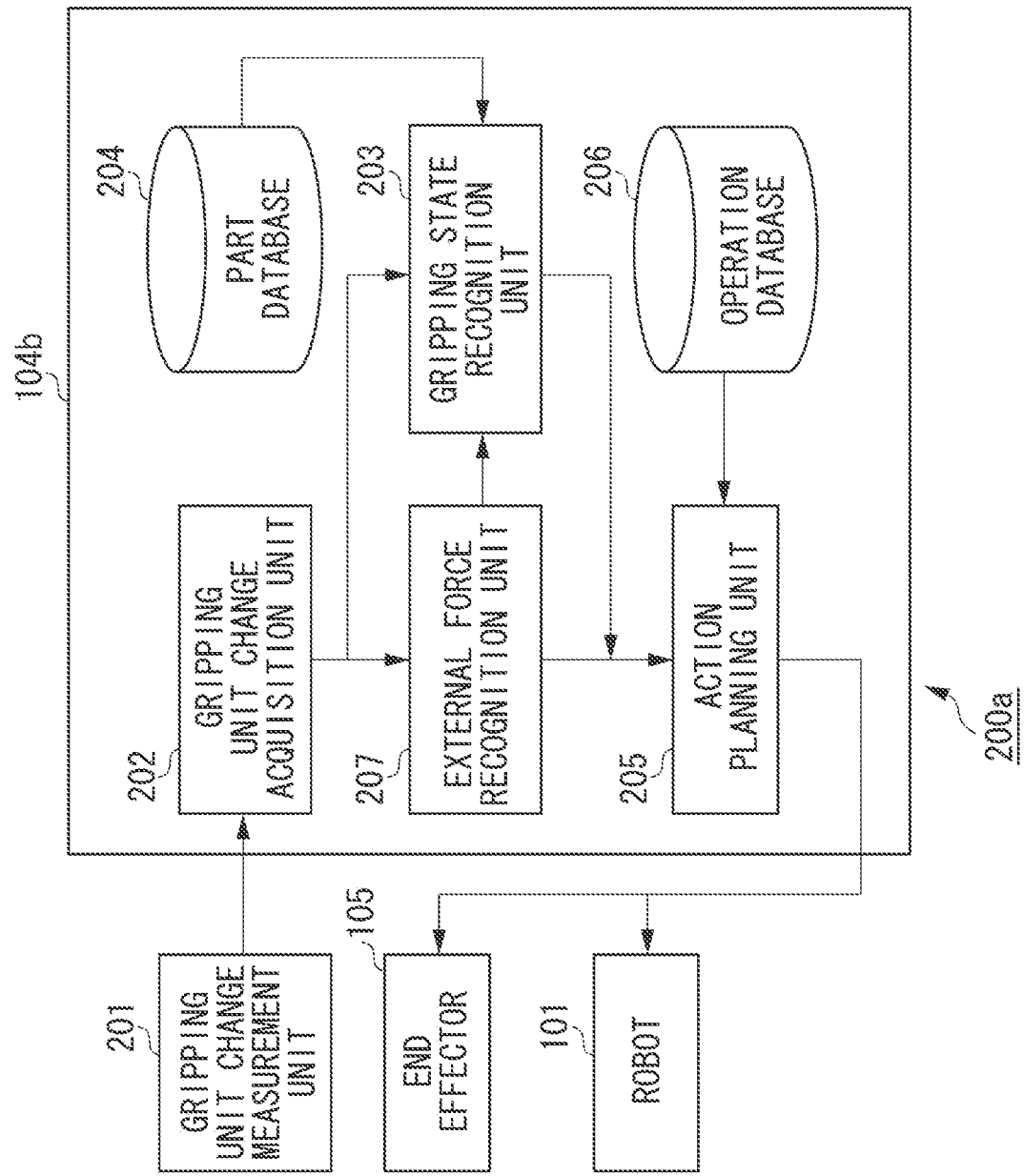
FIG. 7 is a block diagram illustrating functional elements of a robot system according to a second exemplary embodiment.

FIG. 7 is a diagram schematically illustrating a configuration example of functional elements constituting a robot system 200a for implementing the gripping operation and the recognition operation of a target object 106 according to the present exemplary embodiment, and a relationship between the functional elements. A difference between an information processing apparatus 104b illustrated in FIG. 7 and the information processing apparatus 104 illustrated in FIG. 4 lies in an external force recognition unit 207 (third acquisition unit) which will be mainly described below.

The external force recognition unit 207 recognizes (obtains) the external force that the end effector 105 applies to the target object 106 from change information about the gripping unit (fingers) obtained by the gripping unit change acquisition unit 202. More specifically, the external force is determined by using a displacement x of the bar of each finger and rigidity K of the elastic parts attached to the bars (for example, the top portions of the bars) of the end effector 105 as expressed by formula 2.

[Math. 2]

$$F = Kx \qquad \text{formula (2)}$$

The displacement x of the bars of the fingers can be determined as described in the first exemplary embodiment. The rigidity K of the elastic parts attached to the end effector 105 is a known design value. The gripping state recognition unit 203 may use the external force recognized by the external force recognition unit 207 for the recognition processing of the gripping state. The action planning unit 205 may determine an action plan by using the external force. The method of use of the external force by the action planning unit 205 to be described in detail in the description of step S13 in FIG. 8.

Figure 8:
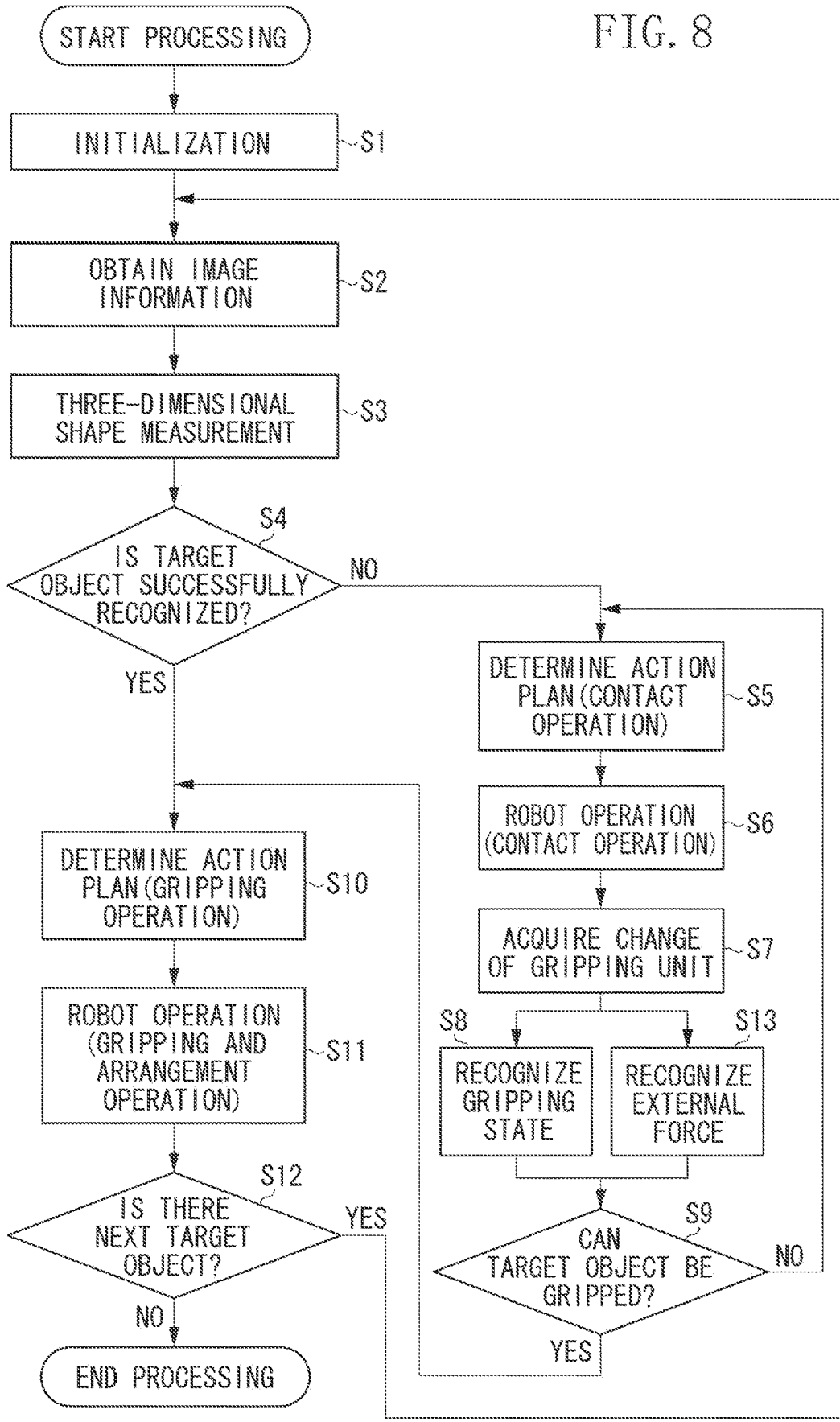
FIG. 8 is a flowchart illustrating processing performed by the robot system according to the second exemplary embodiment.

FIG. 8 is a flowchart illustrating a flow of processing for recognizing and gripping the target object 106 for implementing the robot system 200a according to the present exemplary embodiment. The flowchart mainly illustrates operations inside the information processing apparatus 104b. The processing procedure will be described below with reference to FIG. 8, mainly concerning step S13 which is a difference from the steps of FIG. 5. The processes other than that of step S13 are similar to those illustrated in FIG. 5.

In step S13, the external force recognition unit 207 recognizes the external force applied to the target object 106. More specifically, the external force recognition unit 207 recognizes the external force as expressed by the foregoing formula 2 based on the result of the gripping unit change measurement performed in step S7. The value of the external force applied to the target object 106 recognized thus can be used to recognize the shape of the target object 106.

For example, if the target object 106 to be gripped is wrapped with semitransparent or nontransparent packaging materials, the shape of the object inside the packaging materials is difficult to measure by a vision sensor. In the present exemplary embodiment, whether the target object 106 can be gripped is then determined by compressing the packaging materials around the target object 106 by the end effector 105, measuring the shape of the object inside, and recognizing the gripping state. The external force applied to the target object 106 here needs to be greater than or equal to force $F_1$ at which the packaging materials can be compressed, and smaller than or equal to force $F_2$ at which the target object 106 will not be damaged.

Suppose that such values are measured and known in advance. The robot 101 then needs to be controlled so that the force F applied to the target object 106 satisfies the following formula 3.

[Math. 3]

$$F_1 < F < F_2 \quad \text{formula (3)}$$

Formula 3 may be difficult to satisfy if the robot 101 performs the series of operations (moving operation and gripping operation) toward the target position determined in step S7 only once.

In fact, the processes through steps S5, S6, S7, S8, S13, and S9 can be repeated a plurality of times to perform a processing operation including a feedback loop. More specifically, the external force recognized by the external force recognition unit 207 is sent to the action planning unit 205. The action planning unit 205 can determine an action plan based on the external force. If the external force here does not satisfy the foregoing formula 3, an action plan can be determined so that the fingers perform gripping to satisfy formula 3 while the processing through steps S5 to S9 is continued.

In step S5, the action planning unit 205 determines an action plan. In step S6, the robot 101 and the end effector 105 operate based on the action plan. In step S7, the gripping unit change measurement unit 201 measures the operation, and the gripping unit change acquisition unit 202 acquires the measurement result. In step S13, the external force recognition unit 207 recognizes the external force based on the measurement result. The gripping state recognition unit 203 recognizes the gripping state of the fingers with respect to the target object 106. If the external force does not satisfy the foregoing formula 3 (NO in step S9), the processing proceeds to step S5. In step S5, the action planning unit 205 determines an action plan again. The force F applied to the target object 106 varies from one bar to another of the fingers. All of the bars constituting the fingers do not need to satisfy formula 3.

In the present exemplary embodiment, in step S9, whether there is a bar of a finger that satisfies formula 3 and is in contact with the target object 106, and whether the displacement of the bar satisfying formula 3 is the same as the change in position of the robot 101, are determined. The gripping state recognition unit 203 makes the determinations. If the displacement of the bar is determined to be the same as the change in position, the gripping state recognition unit 203 determines that the end effector 105 is in a state of being in contact with the object inside the packaging materials. In such a state that the end effector 105 is determined to be in contact with the contents, the gripping state recognition unit 203 recognizes the gripping state with respect to the target object 106 as described in the description of the end effector 105. In step S9, the gripping state recognition unit 203 thereby determines whether the target object 106 can be gripped.

As described above, according to the present exemplary embodiment, the elastic parts are attached to provide rigidity with respect to the movements of the bars constituting the fingers in the moving direction.

Consequently, the external force that the bars apply to the target object 106 when making contact with the target object 106 can be recognized to control the external force. In the present exemplary embodiment, the gripping state with respect to the target object 106 can be recognized while the external force applied to the target object 106 is thus controlled. If the shape of the target object 106 can be recognized, the robot 101 can simply proceed to the gripping operation on the target object 106 based on the recognition result. The robot 101 can also proceed to the operation of arranging the target object 106 in an arrangement location 107.

As described above, according to the present exemplary embodiment, even if the target object 106 is, for example, an object wrapped in semitransparent or nontransparent cushioning materials such as a plastic bag whose position and orientation is difficult to be recognized by a vision sensor alone, the shape of the target object 106 can be recognized. More specifically, the robot 101 can compress the cushioning materials to touch and recognize the contents, and grip the target object 106. According to the present exemplary embodiment, the external force applied to the target object 106 can be controlled without using a force sensor or a pressure sensor.

A third exemplary embodiment is configured by adding a force sensor to the end of the robot 101 in the robot system 200 described in the first exemplary embodiment. The third exemplary embodiment is thus configured so that virtual dynamics can be measured upon contact in addition to the shape of the target object 106.

More specifically, a six-axis force sensor 208 is attached to the bottom portion of the end effector 105 lying at the end of the arm of the robot 101. In the present exemplary embodiment, rigidity, viscosity, and an inertia coefficient of the target object 106 can be recognized from the displacements of the bars of the fingers when the end effector 105 comes into contact with the target object 106, and information about the force measured by the force sensor 208.

In the first exemplary embodiment, the shape of the target object 106 is described to be recognized. However, if the target object 106 is a soft and deformable object such as a rubber object, the softness of the object is difficult to measure. In contrast, according to the present exemplary embodiment, the force applied to the target object 106 can be measured to recognize even the softness of the target object 106. With such a configuration, even if the target object 106 is a flexible target object such as a rubber object, the softness can be recognized to classify and arrange the target object 106 in a predetermined arrangement location 107 based on the softness. Since force needed for gripping can be recognized, the target object 106 can be gripped by suitable force. This can reduce the possibility of damaging the target object 106, and can thus increase the possibility of continuing the gripping operation and the arrangement operation of the robot 101 longer.

Figure 9:
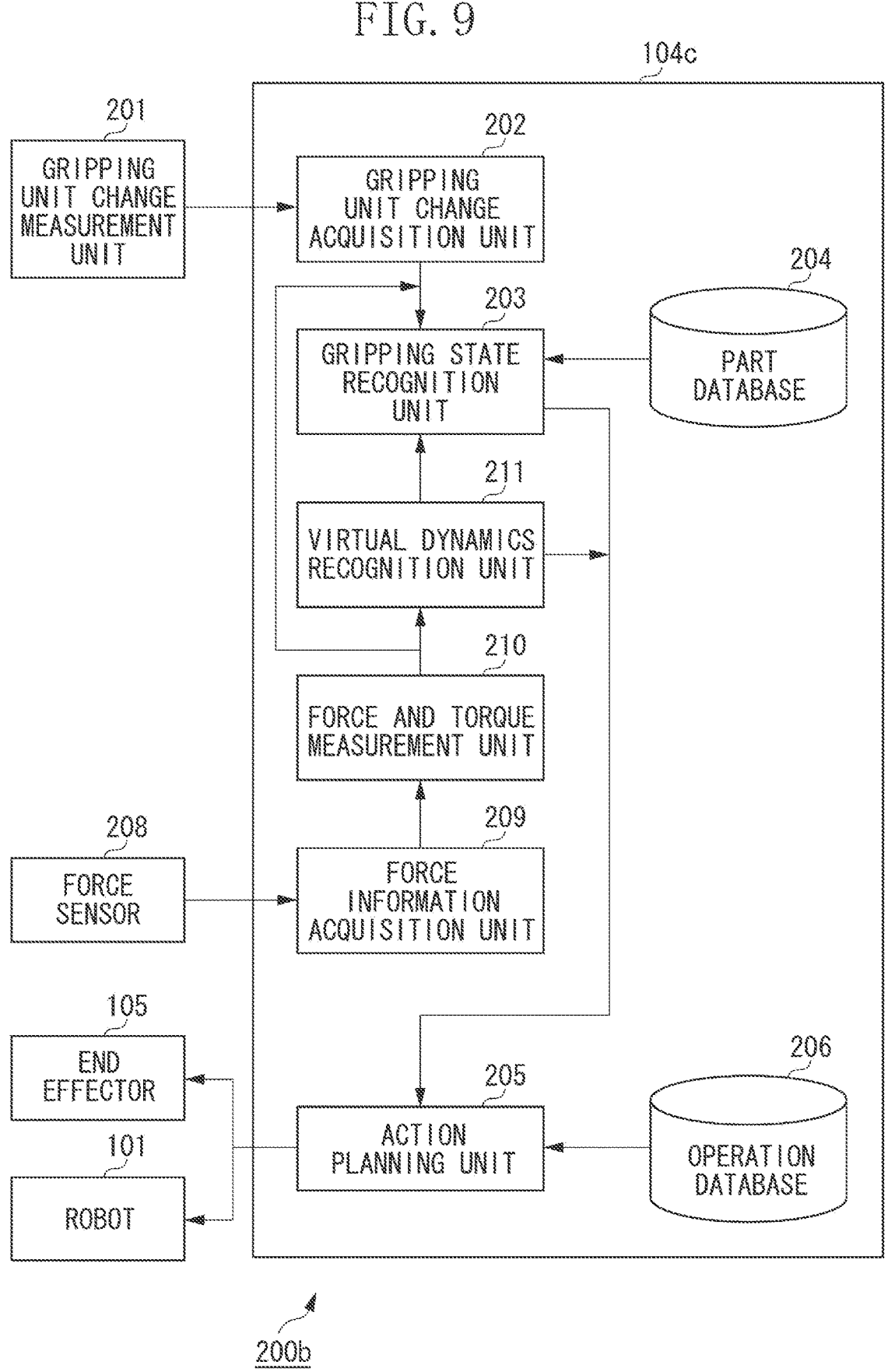
FIG. 9 is a block diagram illustrating functional elements of a robot system according to a third exemplary embodiment.

FIG. 9 is a diagram schematically illustrating a configuration of functional elements of a robot system 200b for implementing the gripping operation of the target object 106 and the recognition processing of the target object 106 according to the present exemplary embodiment, and a relationship between the functional elements. Differences between an information processing apparatus 104c illustrated in FIG. 9 and the information processing apparatus 104 illustrated in FIG. 4 lie in the force sensor 208, a force information acquisition unit 209, a force and torque measurement unit 210, and a virtual dynamics recognition unit 211 which will be mainly described below.

The force sensor 208 is attached to the bottom of the end effector 105 which is attached to the end of the arm of the robot 101. The force sensor 208 is a six-axis force sensor (force/torque sensor) which includes a distortion gauge and a piezoelectric element and measures force and torque applied to the end effector 105 of the robot 101 when the robot 101 grips the target object 106. The force sensor 208 supplies the obtained force information to the information processing apparatus 104c. In the present exemplary embodiment, both force and torque are described to be obtained. However, either one of the two may be obtained.

The force information acquisition unit 209 of the information processing apparatus 104c obtains the force information transmitted from the force sensor 208. For example, the force information acquisition unit 209 includes a storage unit such as a RAM (memory), and obtains and stores the force information. The force information obtained by the force information acquisition unit 209 is used by the measurement unit 210 in calculating force and torque.

The force and torque measurement unit 210 recognizes the force and torque applied to the robot 101 when the robot 101 is gripping or transporting the target object 106, with the force information obtained by the force information acquisition unit 209 as an input. In the present exemplary embodiment, both the force and torque are recognized. However, either one of the two may be recognized. The result of recognition is used by the virtual dynamics recognition unit 211 in recognizing various parameters.

The virtual dynamics recognition unit 211 recognizes the virtual dynamics or softness of the target object 106, including a modulus of elasticity KK, a viscosity coefficient D, and an inertia coefficient M. More specifically, the virtual dynamics recognition unit 211 calculates such parameters by using the following formula 4.

[Math. 4]

$$F = KKx + D(dx/dt) + M(d^2x/dt^2) \quad \text{formula (4)}$$

The displacement x of the bars of the fingers can be determined as described in the first exemplary embodiment. F can be determined by using the force sensor 208 attached to the end of the arm of the robot 101. $(dx/dt)$ and $(d^2x/dt^2)$ are speed and acceleration of the robot 101, respectively. The displacement of the robot 101 may be measured a plurality of times, and the speed $(dx/dt)$ and the acceleration $(d^2x/dt^2)$ may be determined from differences in the displacement. The robot 101 may include an acceleration sensor which can be used to determine $(dx/dt)$ and $(d^2x/dt^2)$.

In such a manner, a plurality of types of values can be determined for each of F, x, $(dx/dt)$, and $(d^2x/dt^2)$. The determined plurality of types of values can be used to derive simultaneous equations from formula 4. The simultaneous equations can be solved to recognize (calculate) the modulus of elasticity KK, the viscosity coefficient D, and the inertia coefficient M. While the technique is described to determine all of the modulus of elasticity KK, the viscosity coefficient D, and the inertia coefficient M, any one or more of the parameters may be determined. For example, in the case of determining only the modulus of elasticity KK, only a change in the position of the bars constituting the fingers may be determined without consideration of the terms including the viscosity coefficient D and the inertia coefficient M in formula 4. Similarly, if only the viscosity coefficient D is determined, only a change in the speed of the bars of the fingers may be determined without consideration of the terms including the modulus of elasticity KK and the inertia coefficient D in formula 4. Similarly, if only the inertia coefficient M is determined, only a change in the acceleration of the bars of the fingers may be determined without consideration of the terms including the modulus of elasticity KK and the viscosity coefficient D in formula 4. Similarly, if two of the parameters are determined, only the terms including the corresponding parameters may be considered.

As described above, according to the present exemplary embodiment, the robot 101 is equipped with the end effector 105. The end effector 105 includes the fingers including the plurality of bars that can move passively conforming to the shape of the target object 106 and grip the target object 106. At least one of the position, speed, and acceleration of the plurality of bars can be measured to recognize virtual dynamics. In the present exemplary embodiment, at least one of the position, speed, and acceleration when the end effector 105 (gripping unit) contacts the target object 106 is thus measured.

Figure 10:
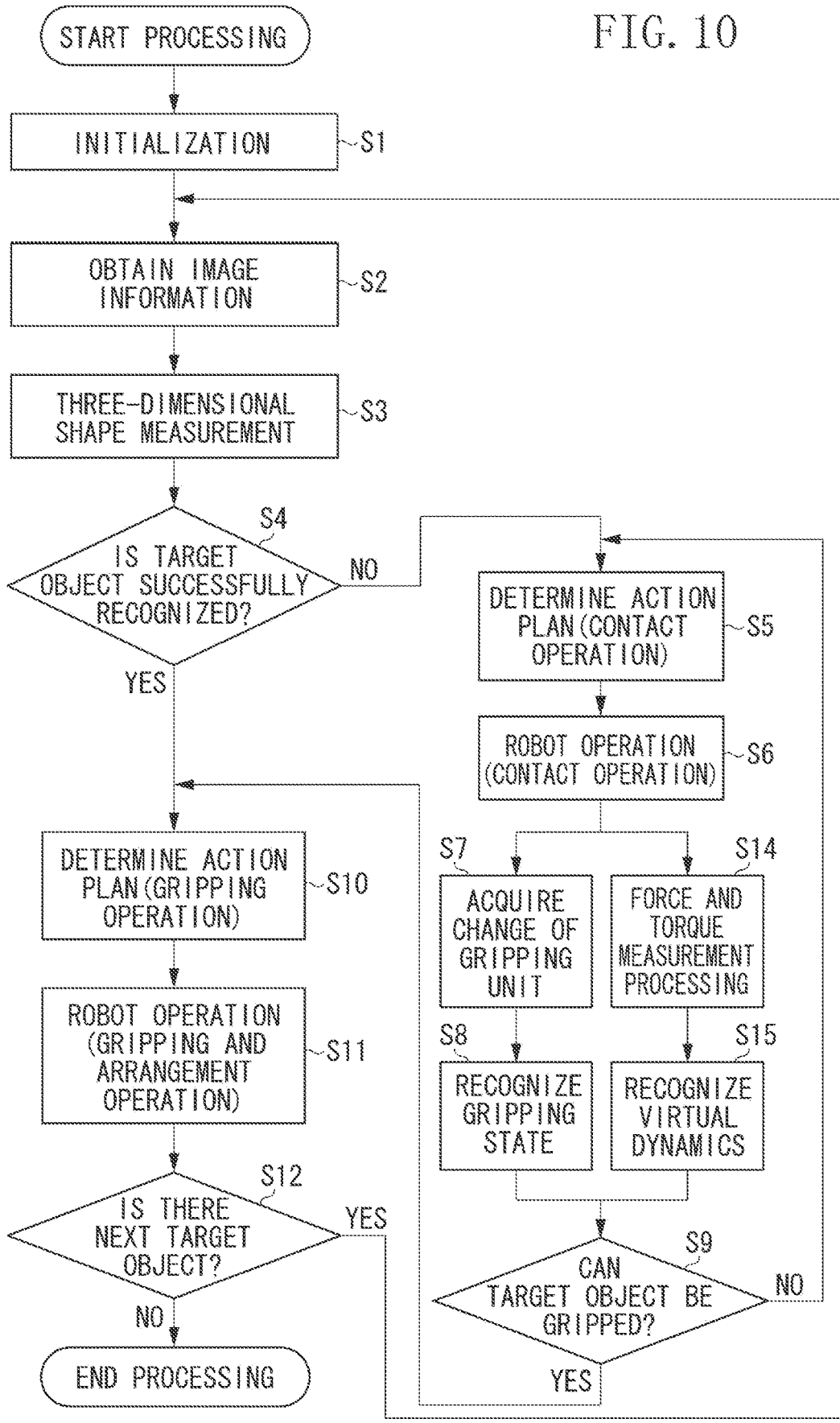
FIG. 10 is a flowchart illustrating processing performed by the robot system according to the third exemplary embodiment.

FIG. 10 is a flowchart illustrating a flow of processing for recognizing the target object 106 and gripping the target object 106 by the robot 101 for implementing the robot system 200b according to the present exemplary embodiment. The flowchart mainly illustrates the operation of the information processing apparatus 104c.

The processing procedure according to the present exemplary embodiment will be described below with reference to the flowchart illustrated in FIG. 10. The flowchart illustrated in FIG. 10 differs from that illustrated in FIG. 5 in steps S14 and S15 which will be mainly described.

In step S14, the force and torque measurement unit 210 performs force and torque measurement processing. The force and torque measurement unit 210 determines force and torque acting on the end effector 105 based on the measurement result of the force information when the robot 101 contacts the target object 106.

When the end effector 105 of the robot 101 contacts the target object 106, various forces act on the end effector 105 of the robot 101 according to the contact operation. The force sensor 208 measures the values of such forces with the distortion gauge and the piezoelectric element. The force sensor 208 thereby measures force and torque as force information resulting from the contact of the end effector 105 with the target object 106. The force information acquisition unit 209 obtains the force information from the force sensor 208, and stores the force information inside. The force and torque measurement unit 210 determines the force and torque based on the force information.

In step S15, the virtual dynamics recognition unit 211 recognizes virtual dynamics. The specific method of recognition is the same as described in the description of the virtual dynamics recognition unit 211. In step S9, the gripping state recognition unit 203 determines whether the target object 106 can be gripped, based on the recognition result of the virtual dynamics recognition unit 211.

In step S10, the action planning unit 205 determines an action plan based on the gripping state recognized thus. The action planning unit 205 may generate the action plan based also on the virtual dynamics recognized by the virtual dynamics recognition unit 211. The robot 101 and the end effector 105 receive commands based on the action plan from the action planning unit 205, and perform operations.

If there is a plurality of types of target objects 106 with different virtual dynamics, the target objects 106 may be classified and arranged in the respective corresponding arrangement locations 107 based on the recognition result. The gripping force of the robot 101 during a gripping operation may be adjusted based on the recognition result of the virtual dynamics. For example, if the target object 106 is a soft object and the end effector 105 grips the target object 106 with the claws 105a and 105b at a fixed distance, the target object 106 may be able to fall off. If the target object 106 is such a soft object, the gripping force for gripping the target object 106 may be set according to the virtual dynamics of the target object 106. If the method for controlling the gripping force according to the recognized virtual dynamics is employed, other sensors (such as a force sensor and a pressure sensor) may be used so that the force in the gripping direction can be measured. A compliance control may be performed on the actuator that opens and closes the fingers of the end effector 105 (opens and closes the claws 105a and 105b).

As described above, according to the present exemplary embodiment, the force sensor 208 is provided at the end of the arm of the robot 101, and the force and torque acting on the end effector 105 are measured. With such a configuration, the force when the end effector 105 contacts the target object 106 can be measured to recognize the virtual dynamics of the target object 106. According to the present exemplary embodiment, even if the target object 106 is a soft object such as a rubber object, the target object 106 can be actually touched to recognize the virtual dynamics. Such recognition enables the gripping operation and arrangement operation of the robot 101 even on a flexible target object 106. The action planning unit 205 can further generate an action plan based on the virtual dynamics.

As described above, according to the present exemplary embodiment, a robot control apparatus that implements both the gripping function and the recognition function by measuring at least one of the position, speed, and acceleration of the plurality of bars which can grip the target object 106 can be provided. A robot control method and a robot system that improvement both the gripping function and the recognition function can also be provided.

(Modification/Application Example 1)

In the first, second, and third exemplary embodiments, the end effector 105 is attached to the end of the arm of the robot 101. However, the end effector 105 may be separated from the robot 101 and used as a jig for fixing the target object 106. Such a jig can be fixed to the target object 106 and measure fixed information about the target object 106 and the shape of the target object 106 from the positions of the bars.

For example, the jig (end effector 105) may be arranged in a predetermined position and location with the bars in a predetermined direction (for example, upward), and the target object 106 may be placed thereon. If the target object 106 is arranged thus, the target object 106 can be more stably placed even if the target object 106 has a complicated shape or if the target object 106 is made of soft material. The positions of the bars may be measured to recognize the shape and softness of the target object 106.

Since the position and orientation of the target object 106 can be more stably fixed, the gripping operation of the robot 101 with respect to the target object 106 is facilitated. In such a case, when the robot 101 makes an approaching operation toward the target object 106, the peripheral bars of the fingers of the end effector 105 retract (contract) appropriately. This reduces the possibility of interfering with the approaching operation toward the target object 106.

(Modification/Application Example 2)

In the first, second, and third exemplary embodiments, the bars of the fingers may be configured to have a hollow structure so that the fingers suck and transport the target object 106 at the ends of the bars, instead of gripping the target object 106. For example, the suction can be implemented by sucking air into the bars constituting the respective fingers by using vacuum ejectors or vacuum pumps for suction purposes or ordinary air pumps.

In such a case, the bars of the fingers may be each configured to detect the presence or absence of contact with the target object 106 so that only the bars in contact suck the target object 106. More specifically, only the ejectors connected to the bars in contact with the target object 106 may be turned on. Such a configuration can reduce waste of airflow.

The suction can thus be controlled by on/off operation of the ejectors. Alternatively, the bars may include valves and the valves may be opened and closed for control.

Such a suction configuration can be employed to suck and transport target objects that are difficult to grip.

(Modification/Application Example 3)

In the first, second, and third exemplary embodiments, the shape and material of the fingers (bars) are not limited in particular. For example, if a rib portion of a flat target object (such as a rib portion of a copying machine) is gripped, the bars of the fingers may be made of flexible material. If the fingers include bars of such material, the bars of the fingers "warp" appropriately when gripping the target object 106. This can suppress variations in the magnitude of the force acting on the target object 106.

A compliance control may be performed on the actuators of the end effector 105 to control the force acting in the gripping direction and measure the virtual dynamics. In such a case, properties in the gripping direction may be measured in addition to the compliance of the servomechanism itself of the robot 101.

To grip a target object 106 among target objects 106 put in a bulk manner, the ends of the bars of the fingers (the side to contact the target object 106) may be configured to be greater than portions sliding in the base. For example, the ends may include spheres having a diameter greater than that of the sliding portions. With such a configuration, the bars may be able to grip the target object 106 without the fingers being opened or closed. More specifically, the "warping" bars constituting the fingers can warp according to the size of the target object 106 when the bars come into contact with the target object 106. The spherical portions described above can come behind the target object 106, depending on the shape of the target object 106. In such a case, the bars may be able to embrace and grip the target object 106 with the spheres.

(Modification/Application Example 4)

In the first, second, and third exemplary embodiments, abnormality detection may be performed after the gripping of the target object 106, based on information about at least one of the position, speed, and acceleration of the fingers (bars). For example, if the target object 106 is successfully gripped, the displacements of the bars of the fingers are supposed to not change after the gripping. If a slip occurs, the displacements can change and any of the foregoing parameters may exhibit an abnormal value. The foregoing parameters can therefore be recognized to detect an abnormality in the operation performed by the robot 101.

More specifically, measurement of the state of the bars of the fingers may be continued after the gripping. If a change occurs, an abnormality detection may be performed for a possible drop or slip.

The target object 106 may tilt while the robot 101 is gripping the target object 106. The robot 101 may then be configured to change the gripping position and grip the target object 106 in a position closer to the center of gravity again if a state of tilt is recognized. If the processing for changing the gripping position is performed, the processing for changing the gripping position may be fed back (applied) to the operation of gripping a next target object 106 to be processed. For example, if a long target object 106 is gripped, the target object 106 may slip and become misaligned on the fingers of the end effector 105. The present modification is useful in such cases.

(Modification/Application Example 5)

In the first, second, and third exemplary embodiments, all of the bars constituting the fingers basically have the same arrangement, the same length, and the same rigidity in the sliding direction. However, the arrangement, the length, and the rigidity in the sliding direction of the bars constituting the fingers may be uneven. For example, bars constituting outer fingers may have a higher density. Outer fingers may include longer bars. Outer fingers may have bars of higher rigidity. According to such a configuration, when the fingers of the end effector 105 contact the target object 106, the target object 106 can be guided to the inner side of the fingers for a more stable gripping state.

The rigidity in the operating (sliding) direction may be nonuniform. For example, outer bars may have higher rigidity. With such a configuration, when the bars grip the target object 106, the target object 106 can be guided to the inner side.

(Modification/Application Example 6)

In the first, second, and third exemplary embodiments, a change of the gripping unit (fingers) and a change of the bars constituting the gripping unit (fingers) both may be measured from an image by using a vision sensor. In such a case, the foregoing imaging device 102 may be used without using a dedicated camera.

If the robot 101 includes an on-hand camera, the on-hand camera may be used instead of the imaging device 102 or with the imaging device 102. If a camera fixed in the working space can be used to measure the fingers (and the bars constituting the fingers), the displacements of the fingers and the bars may be measured from a relationship with the coordinate system of the robot 101.

(Modification/Application Example 7)

In the foregoing exemplary embodiments, techniques capable of gripping a target object 106 of which the shape is difficult to find out by a vision sensor have been described. However, the techniques described in the exemplary embodiments may be used in combination with conventional techniques using a vision sensor. For example, a robot system may be configured to use a conventional technique using a vision sensor if the target object 106 has no semitransparent or nontransparent portion, and use the techniques described in the foregoing exemplary embodiments if a vision sensor is not applicable to the target object 106.

(Hardware Configuration Example)

Figure 11:
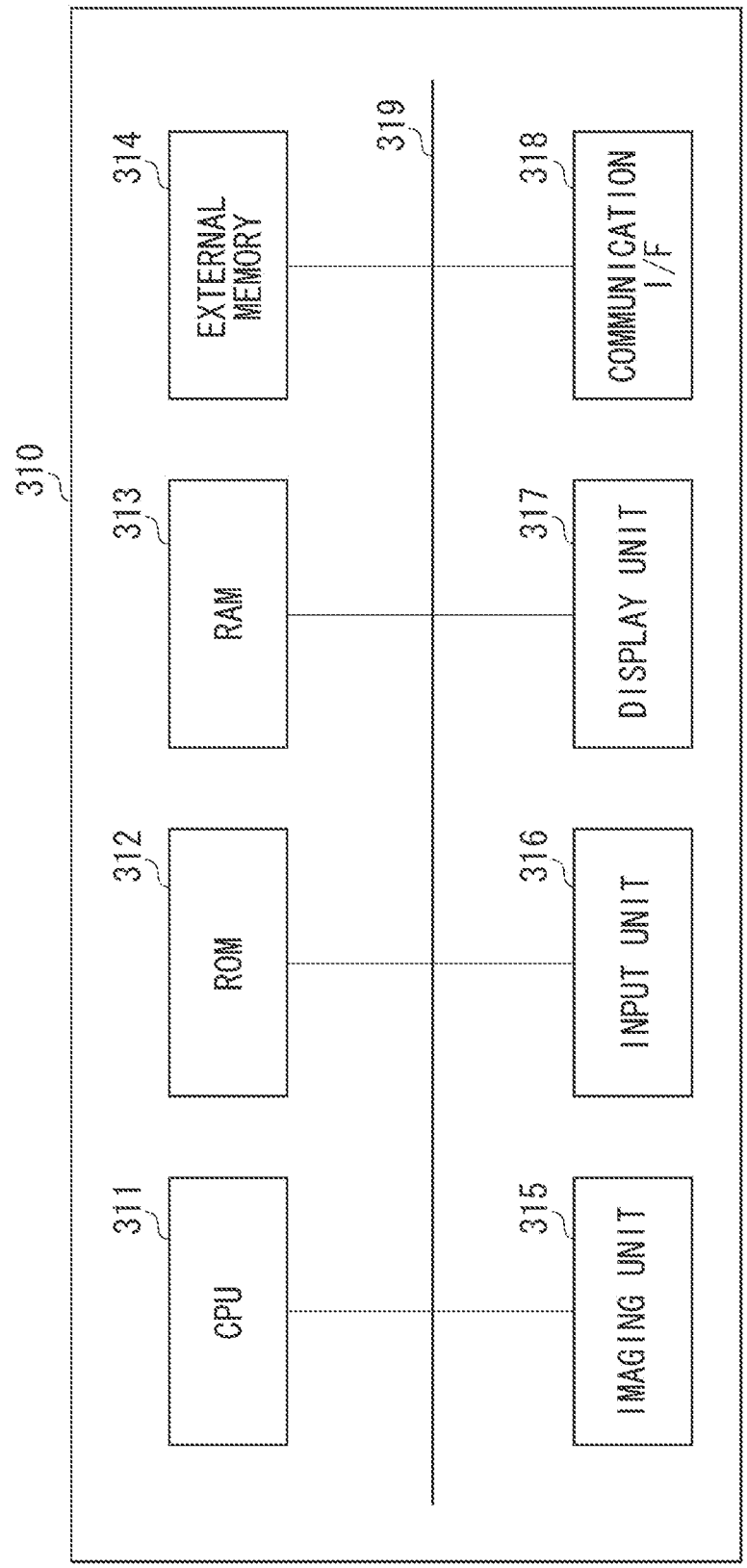
FIG. 11 is a diagram illustrating an example of a hardware configuration of units described in the exemplary embodiments.

FIG. 11 illustrates an example of a configuration of a computer 310 which can constitute various units of foregoing exemplary embodiments. For example, the information processing apparatus 104 illustrated in FIG. 4 can be constituted by the computer 310. The information processing apparatus 104b illustrated in FIG. 7 and the information processing apparatus 104c illustrated in FIG. 9 can also be constituted by the computer 310.

A CPU 311 executes programs stored in a read-only memory (ROM) 312, a RAM 313, and/or an external memory 314 to implement the units of the foregoing exemplary embodiments. The ROM 312 and the RAM 303 can store the programs to be executed by the CPU 311 and various types of data.

The external memory 314 may be constituted by a hard disk, an optical disk, or a semiconductor storage device. The external memory 314 can implement the part database 204 and the operation database 206. An imaging unit 315 can constitute the imaging device 102 and the gripping unit change measurement unit 201.

An input unit 316 can constitute a user interface unit. The input unit 316 may include a keyboard and/or a touch panel. The input unit 316 may include a pointing device such as a mouse, and various types of switches.

A display unit 317 may include various types of displays for providing an arbitrary display to the user. A communication interface (I/F) 318 is an I/F for communicating with external devices. For example, the communication I/F 318 can control an I/F with the gripping unit change acquisition unit 202 and the gripping unit change measurement unit 201 of FIG. 4. The communication I/F 318 can also function as a communication I/F of the action planning unit 205 with the end effector 105 and the robot 101. Such units of the computer 310 are mutually connected by a bus 319.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-070131, filed Mar. 31, 2016, which is hereby incorporated by reference herein in its entirety.

What is claimed is:

1. A robot control apparatus for controlling a robot manipulating a target object, the robot control apparatus comprising:

a camera configured to measure a change of a gripping unit configured to grip the target object when the gripping unit contacts the target object, wherein the gripping unit is an end effector including a plurality of finger-like members configured to be able to move passively conforming to a shape of the target object when contacting the target object;

a force sensor configured to measure at least one of force and torque applied to the end effector;

one or more processors; and at least one memory storing executable instructions, which when executed by the one or more processors, cause the robot control apparatus to:
acquire the change of the gripping unit measured by the camera;
acquire a gripping state, which is a state of gripping of the target object by the gripping unit, based on the change of the gripping unit;
control an action of the robot based on the gripping state acquired; and
acquire a modulus of elasticity of the target object from the change of the gripping unit and a measurement result acquired by the force sensor,
wherein acquiring the gripping state acquires the gripping state of the target object based on the change of the gripping unit and the modulus of elasticity.

2. The robot control apparatus according to claim 1, wherein the instructions, when executed by the one or more processors, cause the robot control apparatus to:
plan the action of the robot based on the gripping state acquired.

3. The robot control apparatus according to claim 2, wherein the instructions, when executed by the one or more processors, cause the robot control apparatus to:
acquire external force applied to the target object by the gripping unit,
wherein the acquiring the gripping state of the target object is performed based on the change of the gripping unit acquired and the external force acquired, and
wherein the planning plans the action of the robot based on the gripping state acquired and the external force acquired.

4. The robot control apparatus according to claim 2, wherein the planning plans the action of the robot based on the gripping state acquired and the modulus of elasticity.

5. The robot control apparatus according to claim 4, wherein the acquiring the modulus of elasticity of the target object acquires the shape and softness of the target object.

6. The robot control apparatus according to claim 2, wherein the planning plans both actions of a contact operation, in which the gripping unit contacts the target object, and a gripping operation in which the gripping unit grips the target object.

7. The robot control apparatus according to claim 6, wherein the instructions, when executed by the one or more processors, cause the robot control apparatus to:
determine whether the gripping unit is able to grip the target object based on the gripping state,
wherein the planning plans an action for the gripping operation in a case where the gripping unit is determined not to be able to grip the target object.

8. The robot control apparatus according to claim 1, wherein the camera is configured to measure the change of the gripping unit based on an image of the gripping unit captured by an imaging unit.

9. The robot control apparatus according to claim 1, wherein the change of the gripping unit is at least one of a position, speed, and acceleration at which the gripping unit contacts the target object.

10. A robot control apparatus for controlling a robot manipulating a target object, the robot control apparatus comprising:
a camera configured to measure a change of a gripping unit configured to grip the target object when the gripping unit contacts the target object;
one or more processors; and
at least one memory storing executable instructions, which when executed by the one or more processors, cause the robot control apparatus to:
acquire the change of the gripping unit measured by the camera;
acquire a gripping state, which is a state of gripping of the target object by the gripping unit, based on the change of the gripping unit; and
control an action of the robot based on the gripping state acquired,
wherein the gripping unit is an end effector including a plurality of finger-like members configured to be able to move passively conforming to a shape of the target object when contacting the target object,
wherein the robot control apparatus further comprises the end effector, and
wherein the gripping state is acquired based on a difference between a change of a finger-like member arranged on an outer side of the end effector and a change of a finger-like member arranged on an inner side of the end effector.

11. A robot control method for controlling a robot manipulating a target object, the robot control method comprising:
measuring a change of a gripping unit configured to grip the target object when the gripping unit contacts the target object, wherein the gripping unit is an end effector including a plurality of finger-like members configured to be able to move passively conforming to a shape of the target object when contacting the target object;
acquiring the measured change of the gripping unit;
acquiring a gripping state, which is a state of gripping of the target object by the gripping unit, based on the acquired change of the gripping unit;
controlling an action of the robot based on the acquired gripping state; and
acquiring a modulus of elasticity of the target object from the change of the gripping unit and a measurement result acquired by a force sensor configured to measure at least one of force and torque applied to the end effector,
wherein acquiring the gripping state acquires the gripping state of the target object based on the change of the gripping unit and the modulus of elasticity.

12. A robot system comprising:
a robot;
a camera configured to measure a change of a gripping unit configured to grip a target object when the gripping unit contacts the target object, wherein the gripping unit is an end effector including a plurality of finger-like members configured to be able to move passively conforming to a shape of the target object when contacting the target object;
a force sensor configured to measure at least one of force and torque applied to the end effector;
one or more processors; and
at least one memory storing executable instructions, which when executed by the one or more processors, cause the robot control apparatus to:
acquire the change of the gripping unit measured by the camera;
acquire a gripping state, which is a state of gripping of the target object by the gripping unit, based on the change of the gripping unit;
plan an action of the robot based on the gripping state acquired; and acquire a modulus of elasticity of the target object from the change of the gripping unit and a measurement result acquired by the force sensor, wherein acquiring the gripping state acquires the gripping state of the target object based on the change of the gripping unit and the modulus of elasticity, and wherein the robot is configured to manipulate the target object based on the action of the robot planned by the planning.

13. A robot system comprising:

a robot;

a camera configured to measure a change of a gripping unit configured to grip a target object when the gripping unit contacts the target object, wherein the gripping unit is an end effector including a plurality of finger-like members configured to be able to move passively conforming to a shape of the target object when contacting the target object;

a force sensor configured to measure at least one of force and torque applied to the end effector;

one or more processors; and at least one memory storing executable instructions, which when executed by the one or more processors, cause the robot control apparatus to:

acquire the change of the gripping unit measured by the camera;

acquire a gripping state, which is a state of gripping of the target object by the gripping unit, based on the change of the gripping unit; and plan an action of the robot based on the gripping state acquired; and;

acquire a modulus of elasticity of the target object from the change of the gripping unit and a measurement result acquired by the force sensor, wherein acquiring the gripping state acquires the gripping state of the target object based on the change of the gripping unit and the modulus of elasticity, wherein the the robot includes an elastic member attached to the gripping unit, wherein the force sensor is configured to acquire an external force applied to the target object by the gripping unit based on the change of the gripping unit measured by the camera and rigidity of the elastic member, and wherein the robot is configured to manipulate the target object based on the action of the robot planned by the planning.

14. A robot system comprising:

a robot;

a camera configured to measure a change of a gripping unit configured to grip a target object when the gripping unit contacts the target object;

one or more processors; and at least one memory storing executable instructions, which when executed by the one or more processors, cause the robot control apparatus to:

acquire the change of the gripping unit measured by the camera;

acquire a gripping state, which is a state of gripping of the target object by the gripping unit, based on the change of the gripping unit;

plan an action of the robot based on the gripping state acquired;

measure at least either force or torque acting on the gripping unit; and acquire virtual dynamics of the target object based on the change of the gripping unit and a measurement result of the measured at least either force or torque acting on the gripping unit to obtain the virtual dynamics of the target object;

wherein the robot includes the gripping unit that is an end effector including a plurality of finger-like members configured to be able to move passively conforming to a shape of the target object when contacting the target object, and a force sensor configured to obtain at least either the force or the torque acting on the end effector, wherein the measuring at least either force or torque acting on the gripping unit measures at least either the force or the torque obtained by the force sensor wherein the gripping state of the target object is acquired based on the change of the gripping unit and the virtual dynamics, wherein the planning plans the action of the robot based on the gripping state acquired and the virtual dynamics, and wherein the robot is configured to manipulate the target object based on the planned action of the robot.

15. A non-transitory computer-readable storage medium storing a computer program including instructions, which when executed by one or more processors of a robot control apparatus comprising a camera configured to measure a change of a gripping unit configured to grip a target object when the gripping unit contacts the target object, wherein the gripping unit is an end effector including a plurality of finger-like members configured to be able to move passively conforming to a shape of the target object when contacting the target object, cause the robot control apparatus to:

acquire the change of the gripping unit measured by the camera;

acquire a gripping state, which is a state of gripping of the target object by the gripping unit, based on the change of the gripping unit acquired;

control an action of the robot based on the gripping state acquired; and acquire a modulus of elasticity of the target object from the change of the gripping unit and a measurement result acquired by a force sensor, wherein acquiring the gripping state acquires the gripping state of the target object based on the change of the gripping unit and the modulus of elasticity.

16. A robot control apparatus for controlling a robot manipulating a target object, the robot control apparatus comprising:

a measurement unit configured to measure a change of a gripping unit when the gripping unit grips the target object, wherein the gripping unit is an end effector including a plurality of finger-like members movable conforming to a shape of the target object when contacting the target object;

a recognizing unit configured to recognize softness of the target object based on a measurement result acquired by a force sensor configured to measure at least one of force and torque applied to the end effector;

an acquisition unit configured to acquire a gripping state, which is a state of gripping of the target object by the gripping unit, based on the measured change of the gripping unit and the softness of the target object;

a determination unit configured to determine a classification of the target object based on the change of the gripping unit and the softness of the target object; and a control unit configured to control an action of the robot based on the gripping state, wherein the control unit controls an arrangement location of the target object based on the determined classification of the target object.

17. The robot control apparatus according to claim 16, wherein the acquisition unit further acquires a shape of the target object based on the measured change of the gripping unit.

18. A robot control method for controlling a robot manipulating a target object, the robot control method comprising:
- measuring a change of a gripping unit when the gripping unit grips the target object, wherein the gripping unit is an end effector including a plurality of finger-like members movable conforming to a shape of the target object when contacting the target object;
- recognizing softness of the target object based on a measurement result acquired by a force sensor configured to measure at least one of force and torque applied to the end effector;
- acquiring a gripping state, which is a state of gripping of the target object by the gripping unit, based on the measured change of the gripping unit and the softness of the target object;
- determining a classification of the target object based on the change of the gripping unit and the softness of the target object; and
- controlling an action of the robot based on the gripping state, wherein the controlling controls an arrangement location of the target object based on the determined classification of the target object.

* * * * *